United States Patent [19]

Heyn et al.

[11] Patent Number: 4,911,005
[45] Date of Patent: Mar. 27, 1990

[54] VELOCITY-MEASURING DEVICE

[75] Inventors: John J. Heyn, Owings Mills; Allen S. Caples, Baltimore, both of Md.

[73] Assignee: The John J. Heyn Co., Inc., Towson, Md.

[21] Appl. No.: 242,320

[22] Filed: Sep. 9, 1988

[51] Int. Cl.⁴ .............................................. G01C 21/10
[52] U.S. Cl. ...................................... 73/187; 364/443
[58] Field of Search ................. 73/187, 186, 182, 183, 73/490; 364/424.01, 443

[56] References Cited

U.S. PATENT DOCUMENTS

| | | | |
|---|---|---|---|
| 439,442 | 10/1890 | Thorne et al. | |
| 3,175,152 | 3/1965 | Shafer | 324/70 |
| 3,433,065 | 3/1969 | Mergler | 73/187 |
| 3,505,878 | 4/1970 | Moll | 73/490 |
| 3,978,725 | 9/1976 | Hadtke | 73/182 |
| 4,071,892 | 1/1978 | Genzling | 364/424 |
| 4,111,444 | 9/1978 | Clements, Jr. | 280/11.37 E |
| 4,136,562 | 1/1979 | Crooker | 73/187 |
| 4,389,537 | 6/1983 | Tsunoda et al. | 179/1 SM |
| 4,546,650 | 10/1985 | Cameron | 73/490 |
| 4,638,448 | 1/1987 | Cuvelier et al. | 73/490 |

Primary Examiner—Donald O. Woodiel
Attorney, Agent, or Firm—Leonard Bloom

[57] ABSTRACT

A combination of a movable structure (adapted to ride on or over a surface while supporting or carrying at least one person) and a velocity-measuring device which includes means responsive to air flow develop an electrical signal representative of current velocity of the movable structure. A voice synthesizing means, responsive to the electrical signal representation of current velocity, provides periodic voice synthesized audible outputs indicative of current velocity of the movable structure. The movable structure may be a snow ski, a water ski or a skateboard, as well as a number of other sport participating implements, such as a bicycle, an ice boat and the like.

57 Claims, 12 Drawing Sheets

LOW BATTERY DETECTOR SECTION

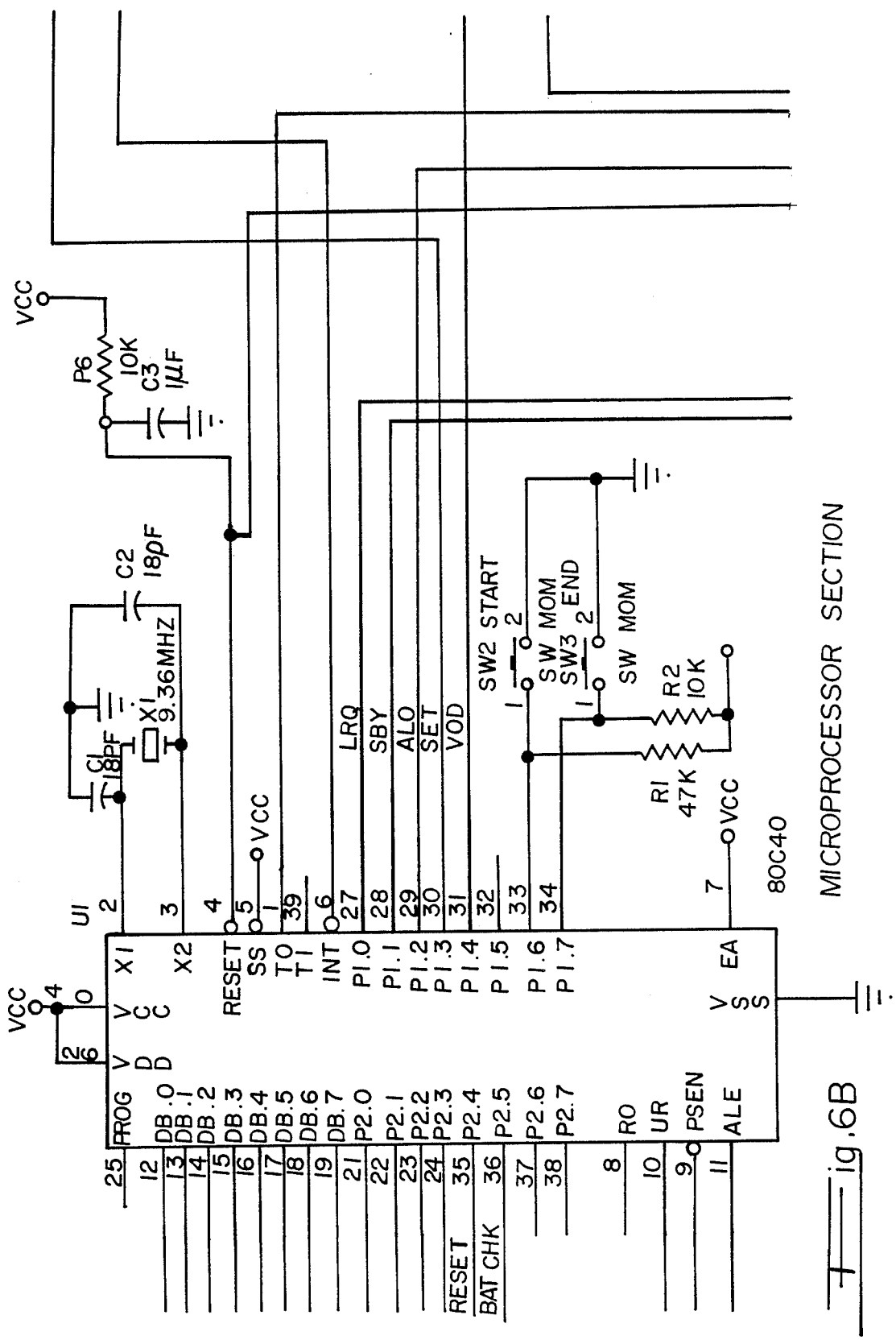

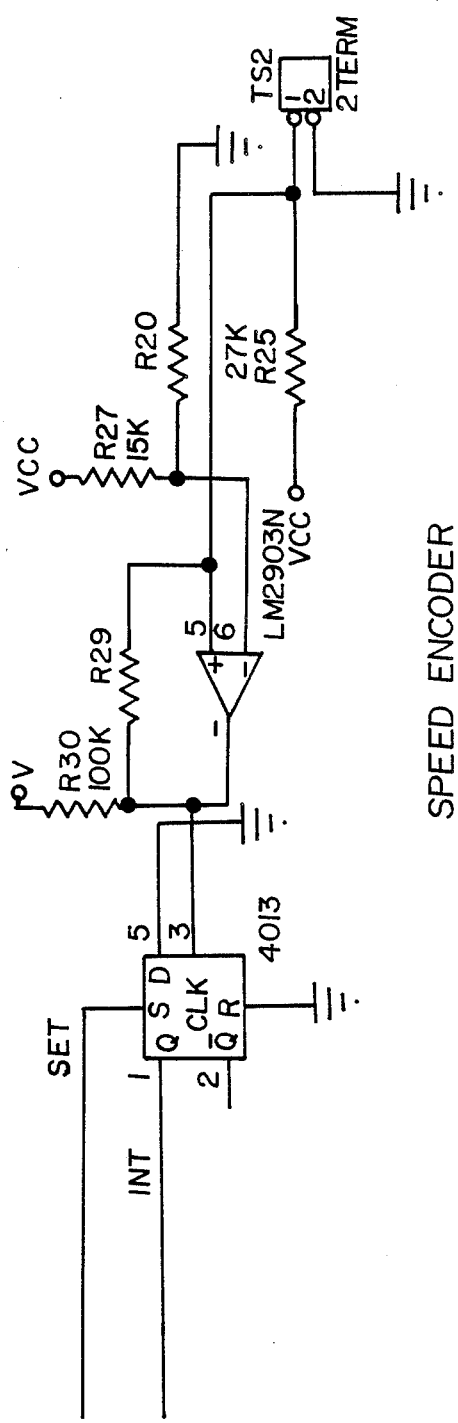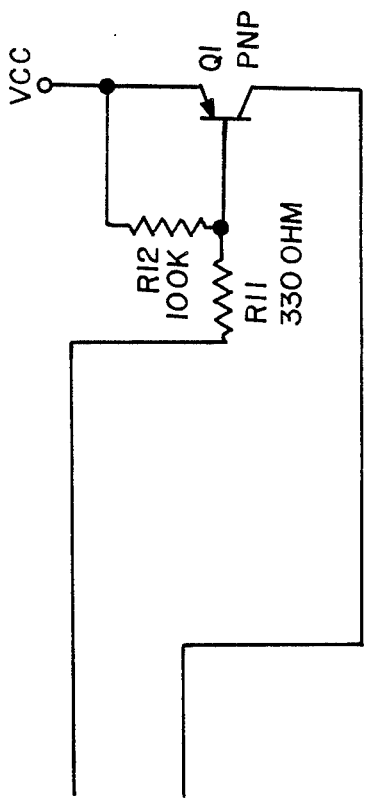
Fig. 6C
SPEED ENCODER

SPEECH SYNTHESIZER SECTION

VELOCITY-MEASURING DEVICE

BACKGROUND OF THE INVENTION

1. Field of the Invention

This invention relates to velocity-measuring devices and, more particularly, to velocity-measuring devices which have an audible output and may be removably attached to skis and the like.

2. Description of the Prior Art

A velocity-measuring device which can be removably fixed to the rear end of a snow or water ski is disclosed in U.S. Pat. No. 4,546,650. The device employs a microcomputer which calculates speeds and/or distance traveled by a skier and displays the selected parameter on a readout device carried by the trailing end of a ski. A toothed wheel is constrained to rotate about an axis lateral to the rear end of the ski and is positioned to contact the snow or water and rotate when it is moved in direction to the axis of the ski. The water-snow-contacting wheel carries two permanent magnets which cooperate with a sensor mounted on the housing of the device to sense the passing of the magnets. In order to determine his or her maximum speed, average speed, or the distance traveled, a skier would have to remove his or her skis to see the visual display, a distinct disadvantage. Moreover, while in motion, no information is made available to the skier about his or her current speed, a shortcoming especially in situations in which the skier is trying to ski to his or her maximum advantage along a portion of a down-hill run, or the like.

A speed indicating device or gauge which may be mounted on the forward flat upper surface of the water ski is known from U.S. Pat. No. 3,978,725. This indicator is so mounted that the user of the ski during water skiing may view this speed indicating device. The velocity sensing is achieved by a pilot tube-like device in which one end of the tube is connected to the meter and the other end is disposed on the ski underside and at the rear thereof. The tube is filled with liquid to a point near the rear of the tube where a flexible diaphragm seals the tube. The diaphragm is actuated by the pressure of the fluid flow created by the rate of travel of the ski in the water, No. provision is seen for storing the output nor of any electronic circuitry. Clearly, the device cannot be used on a snow ski or the like, nor does it provide an audible output.

Other devices, which may be attached to skis and the like for measuring velocity, are revealed in U.S. Pat. Nos. 3,505,878 and 4,262,537. These devices are fastened to a ski by screws and must be mechanically powered, thereby interfering with the natural operation of the ski, distinct shortcomings.

SUMMARY OF THE INVENTION

An object of the present invention is to provide a velocity-measuring device which may be removably fixed to a snow ski, water ski, ice-boat, skateboard, bicycle, arm band or the like and provide current audio information to the user while he or she is in motion.

Another object of the present invention is to provide a velocity-measuring device which may be removably fixed to a snow ski, water ski, ice-boat, skateboard, bicycle, arm band or the like and provide an audio summary of velocity and velocity-related data concerning a completed run.

A further object of the present invention is to provide a velocity-measuring device which may be removably fixed to a snow ski, water ski, ice-boat, skateboard, bicycle, arm band or the like and provide an audible audio output of current performance to the user, while he or she is in motion.

An additional object of the present invention is to provide a velocity-measuring device which may be removably fixed to a snow ski, ice-boat, water ski, skateboard, bicycle, arm band or the like and provide an audible output constituting a summary of velocity and velocity-related data concerning a competed run.

The velocity-measuring device of the present invention s a small, battery operated, microprocessor-based electronic device which provides an audible output of user performance. It may be mounted to the front half of a snow ski, just in front of the binding toe piece, where it is clearly in the air stream generated by the moving ski. In other variants, the device may be mounted on a skateboard, a water ski, a surfboard, a wind-surfer, a bicycle, an ice-boat, an arm-band or the like. Velocity through the air is measured by microprocessor-based circuitry, which reads the speed of a small, integral wind turbine wheel, performs all conversions and calculations, and controls a voice synthesis circuit.

The device of the present invention requires minimum operator interaction. The only operator controls are two push buttons and a volume control with integral battery power off/on switch. A loudspeaker and/or an earphone jack is provided for audible outputs.

Clearly audible synthesized speech output of information allows the user to hear his or her current speed with minimum diversion of his attention from the main goal of safe skiing or operating other person-supporting moving structures. Also, upon completion of a run, the device of the present invention may provide, on demand, a comprehensive summary of average speed, maximum speed, elapsed time and distance covered for the run, as well as a recapitulation of the speed during the run if desired.

The device of the present invention has three operating modes. The first, its reset mode, occurs when the device is first activated and each time the user initiates current operating mode. It initializes all hardware, software, and output parameters. In the current operating mode, the device performs real time velocity measurements and effects audible outputs of velocity at predetermined intervals, for example at five second intervals. In the third mode, a summary mode, the device provides an audible summary of the latest operating mode interval. No measurements are performed during summary mode. The four output parameters, namely average speed, maximum speed, time and distance, continuously sequence until the device is either deactivated or reset by the operator.

The device of the present invention measures air speed, so its operation is completely independent of contact with either the ground surface, the snow surface, the water surface, the ice surface or the like, as the cases may be. It is also mounted, in the snow ski embodiment and similar realizations, in front of the boot attachment where it is relatively protected from physical abuse. A fabric hooks-to-hooks or loops-to-hooks mounting system (of the type sold under the trademark VELCRO ®) provides secure attachment to the ski surface or the like, which is also readily removable for security purposes. The volume of the audible output is adjustable to suit the user's requirements. Also, the circuitry may provide audible indication of low battery voltage.

All operational functions, as well as internal calculations and conversions, are completely under software control and may be modified by program changes.

From one vantage point, the invention can be viewed as being in combination with a movable structure adapted to ride on or over a surface while supporting or carrying at least one person. A velocity-measuring device, which includes means responsive to air flow, develops an electrical signal representative of current velocity of the movable structure. Voice synthesizing means, responding to the electrical signal representation of velocity, provides periodic voice synthesized audible outputs indicative of current velocity of the movable structure.

The invention can also be seen as being a combination of a movable structure adapted to ride on or over a surface while supporting or carrying at least one person and a velocity-measuring device for developing an electrical signal representative of current velocity of the movable structure. Voice synthesizing means respond to the electrical signal representation of current velocity and provide periodic voice synthesized audible output indicative of current velocity of the movable structure.

From a slightly different point of view, the invention can be seen as being in combination with a structure adapted to be carried by a person, for example supported on the arm of the person. A velocity-measuring device having means responsive to air flow develops an electrical signal representative of velocity of the structure (and thus the person). Voice synthesizing means responsive to the electrical signal representative of velocity provides periodic voice synthesized audible output indicative of velocity of the structure (and thus the person).

The invention can also be viewed as a combination of a structure adapted to be removably fixed to a person and a velocity-measuring device fixed to the structure for developing an electrical signal representative of current velocity of the structure and thus the person. Voice synthesizing means respond to the electrical signal representation of current velocity and provide periodic voice synthesized audible outputs indicative of current velocity of the structure of thus the person.

The device and the synthesizer are preferably removably fixed to the structure. The means responsive to the electrical signal provides periodic voice synthesized audible output indicative of current velocity of the structure at substantially five second intervals.

The means responsive to the electrical signal may include a loudspeaker for providing the voice synthesized audible output.

The means responsive to the electrical signal may include earphone means for providing the voice synthesized audible output.

The device may include responsive to the electrical signal for providing representations of the velocities of the structure for playback after a run.

The device may include means responsive to the electrical signal for producing voice synthesized representations of average speed, maximum speed, elapsed time and distance in its summary mode upon request.

The structure may be any snow- or ice-engaging structure, a snow ski, a skateboard, a water ski, a surfboard, a wind-surfer, a bicycle, an ice-boat, a band (such as an arm-band which is adapted to be attached to a person and carry the device) or the like.

The invention can also be viewed as a circuit for measuring velocity which includes means for producing an electrical signal representative of velocity. Microprocessor means, including, programming means, respond to the electrical signal for generating output signals representative of current velocity. Speech synthesizer means coupled to the microprocessor means respond to the output signals for developing synthesized audio signals representing velocity. Sound producing means coupled to said speech synthesizer respond to the synthesized audio signals for producing an audible output reporting velocity and/or velocity-related data.

The invention can also be viewed as a combination of a support, a velocity measuring device and a fabric mounting system. The velocity-measuring device includes means responsive to air flow for developing an electrical signal representative of current velocity of the support. Voice synthesizing means respond to the electrical signal representative of current velocity for providing voice synthesized audible outputs indicative of current velocity of the support. The fabric mounting system removably fixes the velocity-measuring device to the support.

The fabric mounting system preferably comprises a first elongated fabric member fixed to a surface of the support and a second fabric member fixed to a surface of the device and which can be brought into contact with the first elongated fabric member.

The invention achieves other objects and is characterized by other features and advantages which, with the foregoing objects, are to become apparent from the following description when considered in conjunction with the accompanying drawings. It is to be understood, however, that the invention is not limited to the embodiments illustrated and described, since it may be embodied in various forms within the scope of the appended claims.

DETAILED DESCRIPTION OF THE PREFERRED EMBODIMENTS

Figure 1:
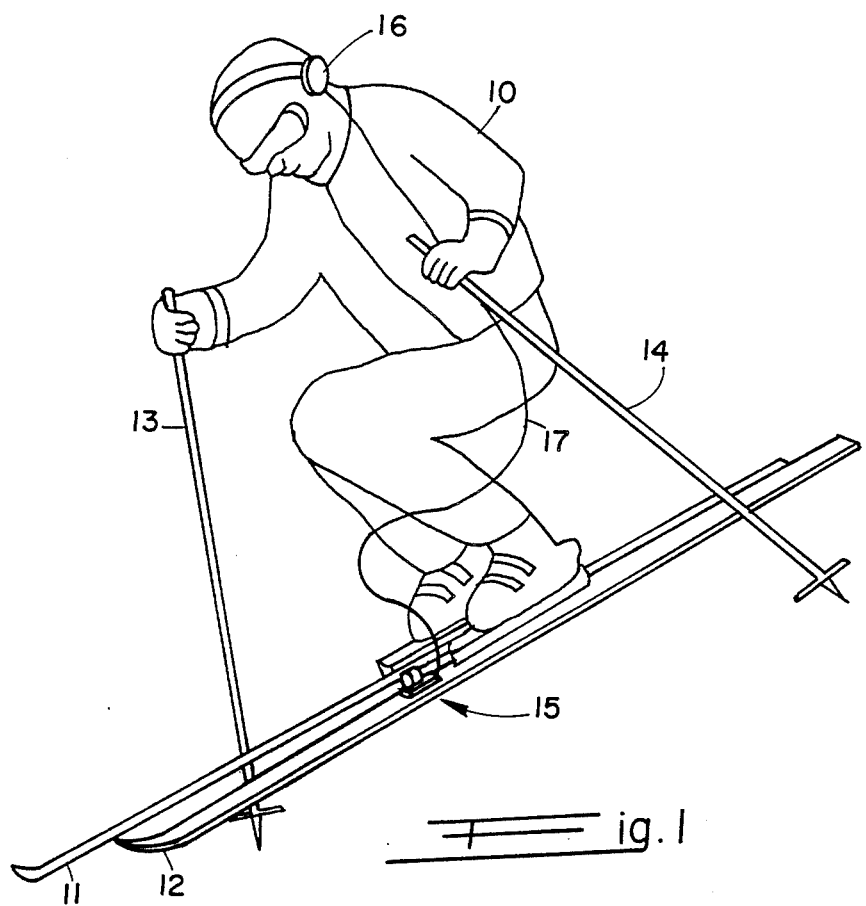
FIG. 1 is a pictorial illustration of a velocity-measuring device of the present invention as applied to one ski of a pair of snow skis, in accordance with an exemplary embodiment of the present invention.

In FIG. 1, a person 10, illustrated as a skier, is shown in a snow skiing attitude aboard a pair of snow skis 11 and 12, with a pair of ski poles 13 and 14 in hand. A velocity-sensing device 15, constructed in accordance with the present invention and shown in more detail in FIGS. 2, 3 and 4A-4C, is attached to the upper surface of the left ski 12 forward of the person 10. The person 10 has conventional earphones 16 over his ears, the earphones 16 being attached to the velocity-sensing device 15 via a conventional cord 17 and a plug-and-jack arrangement for the purpose of supplying audible signals indicative of the velocity of the skis from the device to the person. A loudspeaker (not shown) could be used as an alternative to the earphones.

Figure 2:
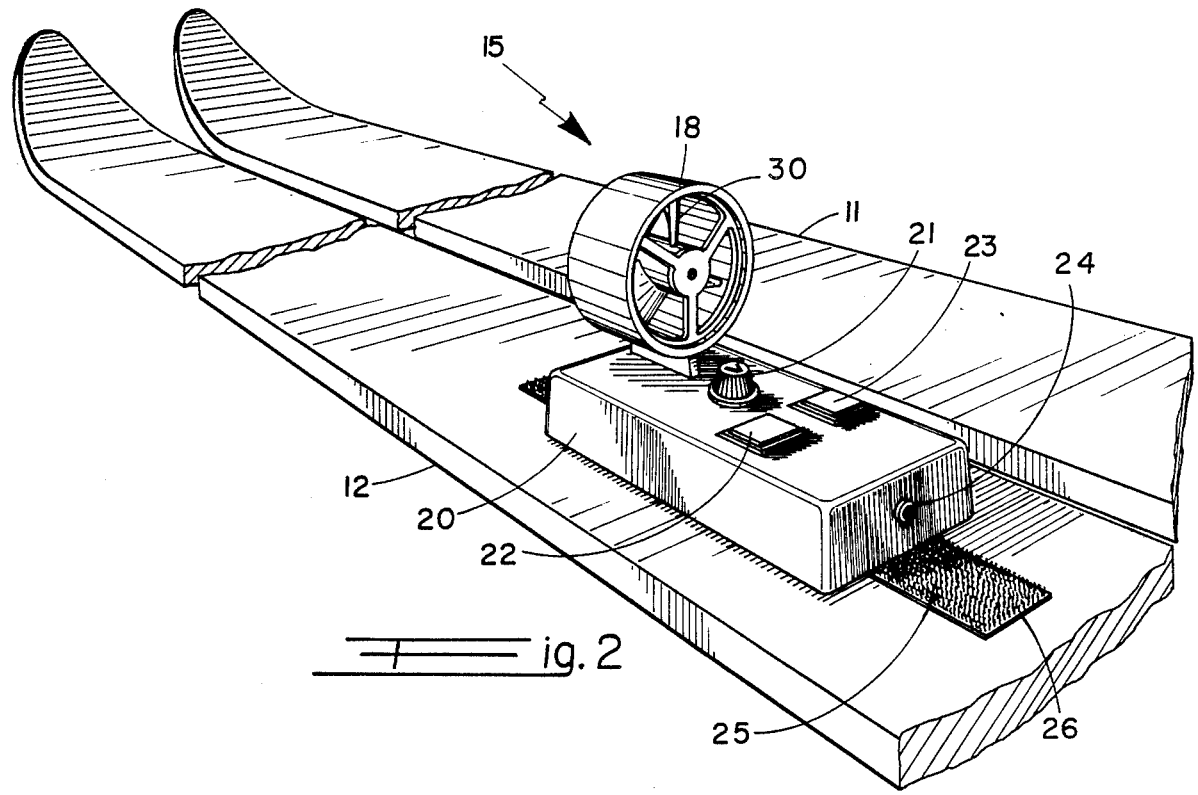
FIG. 2 is a pictorial view of portions of the pair of snow skis of FIG. 1, the velocity-measuring device being shown removably fixed to the upper forward surface of the left ski, in accordance with the above-noted exemplary embodiment of the present invention.
Figure 3:
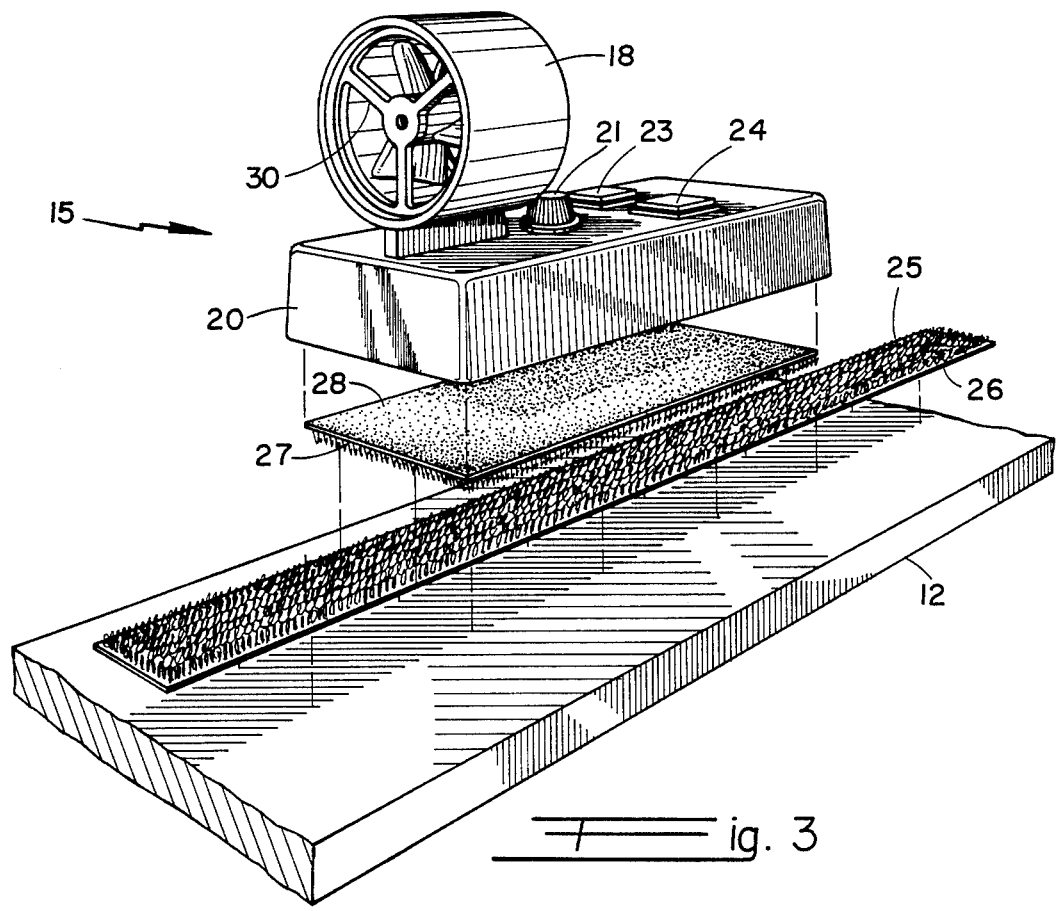
FIG. 3 is an enlarged, partially exploded view of the device and a portion of the left ski of FIG. 2, showing the velocity-measuring device as viewed from the tips of the skis.
Figure 4:
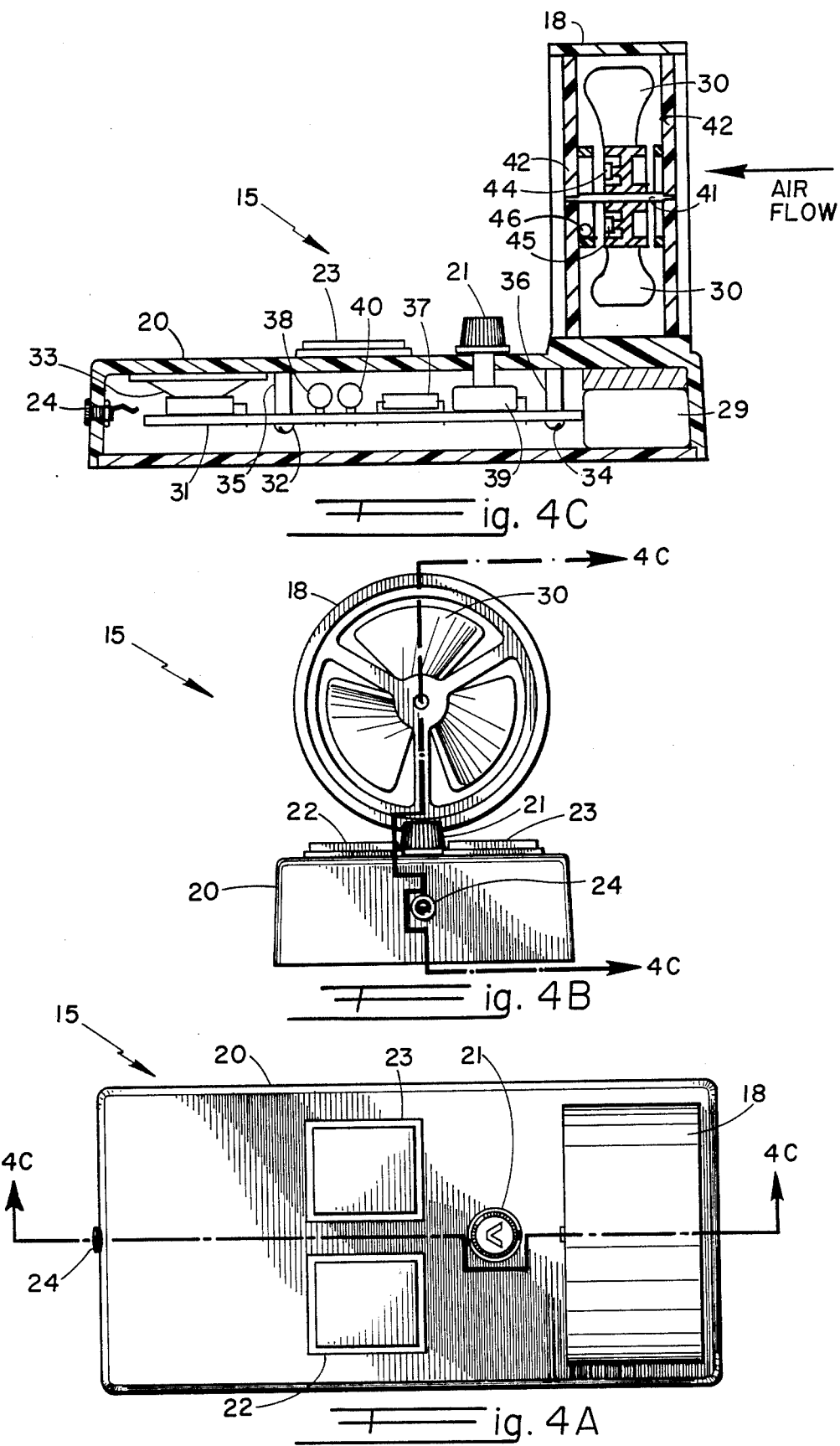
FIGS. 4A–4C are respectively top, front and side views of the velocity-measuring device of FIGS. 1–3, the side view being shown in cross-section to illustrate the placement of some of the internal components, the section being taken along section lines 4C–4C of FIGS. 4A and 4B.

As illustrated in FIGS. 2 and 3, the velocity-sensing device 15 includes a "Thorgren" fan positioned in a hollow cylindrical open ended housing 18 supported above a principal housing 20 by an upstanding flange. The housing 18 constitutes a stationary portion of a wind turbine which includes conventional turbine blades 30 mounted for rotation, by wind forces, about an axle coincident with the axis of the cylindrical housing 18. Rotor and stator members of conventional construction are provided within the housing 18, the stator includes a pick up coil or the like which develops an electrical pulse train output, the frequency of which depends linearly and directly on the angular velocity of the rotor as driven by the turbine blades 30. The rotor includes a disk and carries a pair of "Bunting" centerless ground magnets (FIG. 4C).

An earphone jack 24 is provided in the rear wall of the principal housing 20. A volume control knob 21 is provided adjacent to and above the upper wall of the housing 20 for the purpose of setting the level of the audio available via the earphone jack 24. Two push buttons 22 and 23 (also shown schematically in FIG. 5) are conveniently provided for respectfully initiating a resetting of the device 15 and for initiating a summary mode of operation, subsequent to a ski run or the like.

As best shown, as an exploded view, in FIG. 3, the velocity-measuring device 15 is removably fixed to the ski 12 by a fastener arrangement of loops-to-hooks fabric or a hooks-to-hooks fabric connection (such as the fabric fastener commercially sold under the trademark VELCRO ®). As shown, a first elongated fabric member 26 is fixed to the upper surface of the ski 12 by a mastic, double-sided tape 26 or the like. The entire bottom surface of the principal housing 20 is fixed to a second fabric member 27 by a second mastic, double-sided tape 28 or the like. When the opposing surfaces of the two fabric members 25 and 27 are brought together, the device 15 is firmly, yet removably, fixed to the ski 12. The position of the device along the member 26 can be conveniently selected by the user and, because the width of the fabric member 27 is greater than the width of the fabric member 26, the device 15 may be rocked from side-to-side and, thus, can be removed from the ski rather easily.

Figure 7:
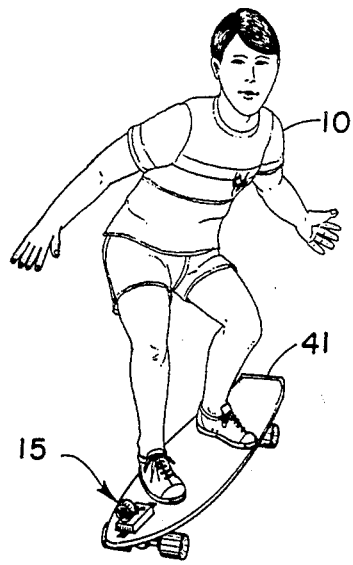
FIGS. 7-13 are respective pictorial illustrations of adaptations of the velocity-measuring device of the present invention as applied respectively to a skateboard, a water ski, a bicycle, the arm of a person, a surfboard, a wind-surfer and an ice-boat.
Figure 8:
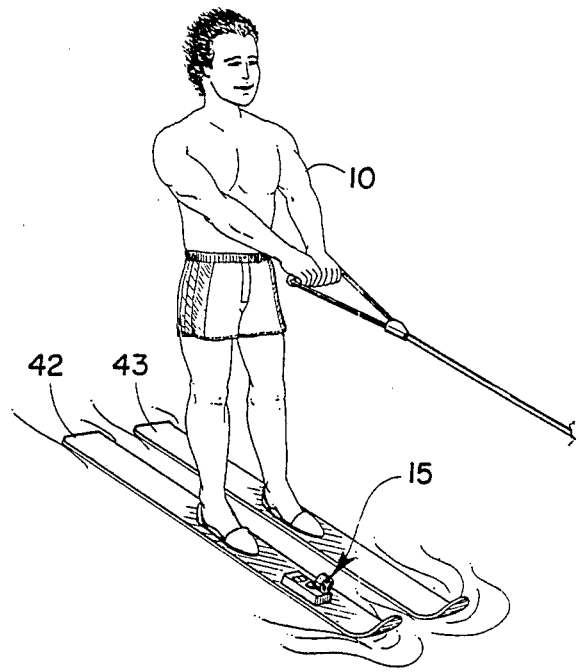
Figure 9:
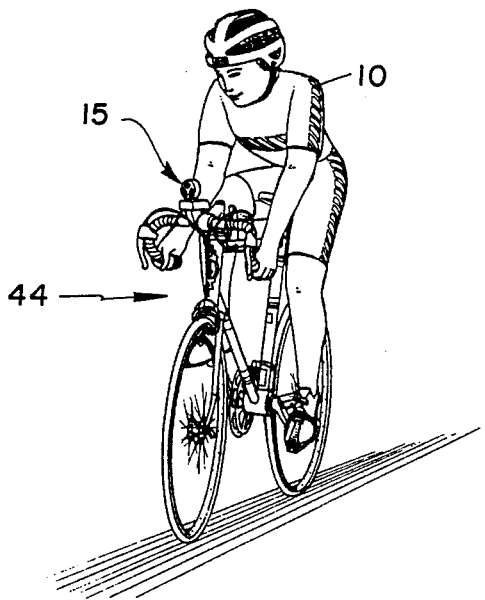
Figure 10:
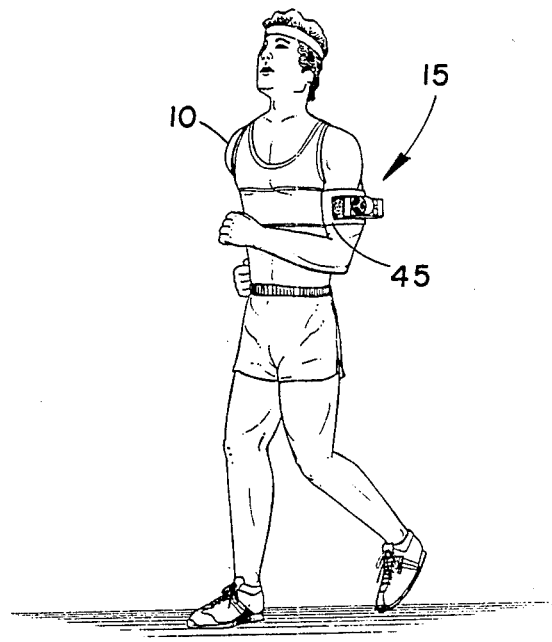
Figure 11:
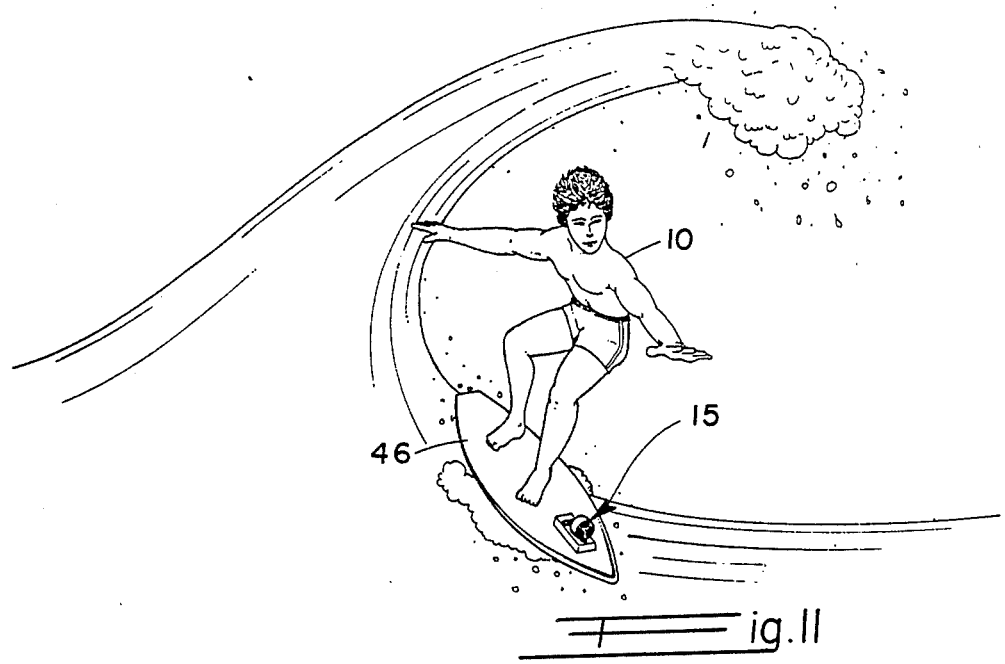
Figure 12:
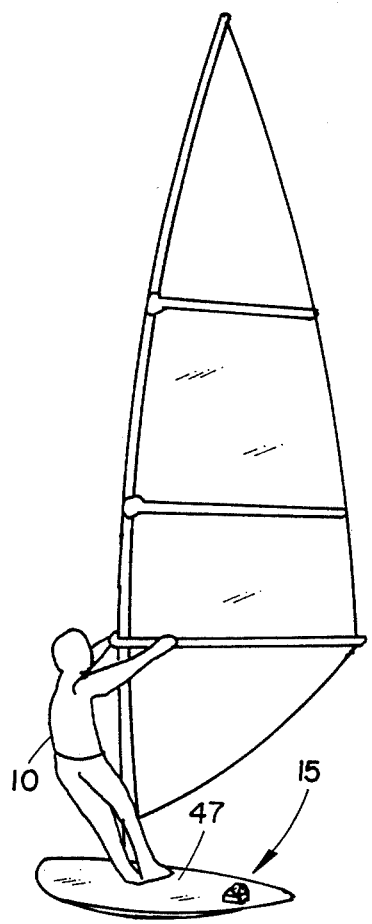
Figure 13:
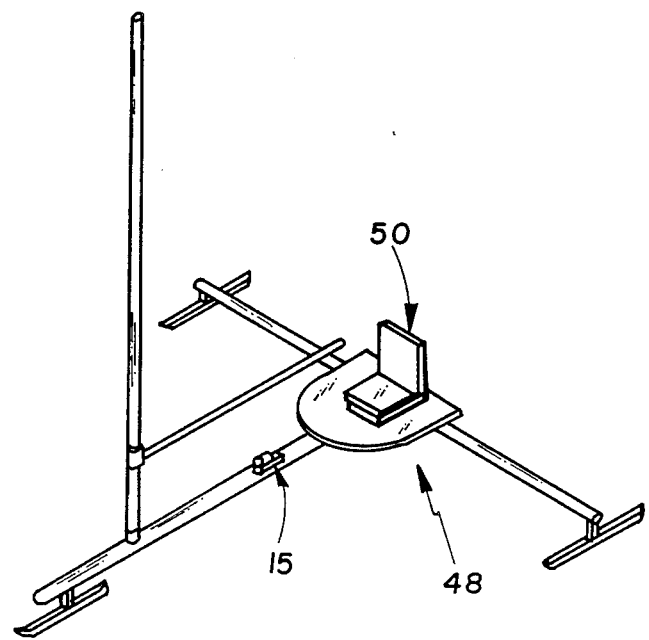

Turning briefly to FIGS. 7-13, it can be seen that the velocity measuring device 15 may be carried by structures other than a snow ski (FIGS. 1-3). In FIGS. 7 and 8, the device of the present invention is shown attached respectively to a skateboard 41 and to the right ski 42 of a pair of water skis 42, 43, a person 10 being shown in each case as being carried by the skateboard and water skis. As shown in FIG. 9, the person 10 is illustrated as being a bicycle rider, the device 15 being removably mounted on a central portion of the handlebar of a bicycle 44. In FIG. 10, the person 10 has a flexible, removable armband 45, of the fabric fastening type, on which the device 15 is mounted. On other variants, the person 10 could be riding a surfboard 46 or a wind surfer 47, shown respectively in FIGS. 11 and 12 with the velocity measuring device 15 being removably fixed to an upper surface thereof. In FIG. 13, an ice-board 48 is shown generally the device 15 being removably fixed to an upper surface of the forward leg of the convention T-structure of the ice-boat. A seat 50 is provided to enable a user to operate the ice-boat. In each of the cases shown in FIGS. 7-13, the device 15 may include an earphone jack (see FIGS. 1-3) so that the person 10 using the structures for sport may receive the audio output from a voice synthesizer within the housing 20 (FIGS. 1-3). It is to be understood, as noted above, that a loudspeaker could be provided within the housing 20 (see FIG. 4A) so that the audio output can be heard without the earphone or as an alternative to the earphones.

An exemplary embodiment of the velocity-measuring device 15 is illustrated in FIGS. 4A-4C, FIGS. 4A and 4B are respectively top and front elevational views of the device, while FIG. 4C is a side cross-sectional view, the section having been taken along section lines 4C-4C in FIGS. 4A and 4B. As shown in FIGS. 4A-4C the device 15 includes the main housing 20 which supports, by an integral web or the like, the open-ended cylindrical housing 18 within which wind turbine is housed and positioned for rotation effected by air (wind) flow, a plurality of turbine blades 30 being provided for this purpose. An earphone jack 24 is visible in FIGS. 4A-4C as are the volume control knob 21 and the summary mode initiating button 23. The reset button 22 is visible in FIG. 4B. In FIG. 4C, a volume control rheostat 39 mechanically coupled to the volume-control knob 21 is visible, the rheostat 39 being mounted on a printed circuit board 31 which is fixed to the upper, inner surface of the housing 20 by four screws, two of which (designated by numerals 32 and 34) are visible, conventional hollow cylindrical spacers 35 and 36 being provided to space the printed circuit board 31 from the top interior surface of the housing 20. It is to be appreciated that other circuit components, including generally shown components 37, 38 and 40, visible in FIG. 4C, are also mounted on the circuit board 31. A loudspeaker 33 is mounted on the circuit board 31 for the purpose of providing an audible output which may be heard by the user, such as the skier 10 (FIG. 1), were he to elect not to use the earphones 16 (FIG. 1). The device 15 is powered from a nine (9) volt battery 29 which is removably positioned within the housing 20.

The details of construction of the wind turbine positioned within the cylindrical housing 18 is best seen in FIG. 4C. The turbine blades 30 (two being visible in FIG. 4C) are mounted for rotation, by wind forces, about an axle 41 coincident with the central axis of the cylindrical housing 18. The axle 41 is carried by a pair of bearings positioned centrally in respective spaced apart blade guards 42 and 43. The integral central or hub portion of the blades 30 is fixed to the axle 41 for rotation therewith and include hollow portions within which are carried two "Bunting", centerless magnets 44 and 45. The magnets 44 and 45 rotated with the axle 41, as a result of wind (air) flow through the housing 18, past a fixed conventional magnetic pickup 46. It is to be understood that the magnetic pickup arrangement described above may be replaced by other sensing arrangements. For example, the velocity (speed) signal could be produced optically, the spinning turbine blades 30 (or other moving part of the turbine) could repeatedly break a low power IR-LED light beam. The resulting pulsed light beam would be translated into an electric signal by a phototransistor. Other possible arrangements, include a plurality of magnets associated with reed switches or Hall-effect transistors could be used to produce a suitable signal. A contact wheel or an ultrasonic doppler echo-radar may be used instead.

Briefly stated, the circuitry of the velocity-measuring device includes two main electronic subsystems, a microprocessor subsystem and the voice synthesis/output subsystem. Several other auxiliary subsystems serve to enhance the operation of the main subsystems and provide operator interface. The entire circuit may be mounted on a single printed circuit board (PCB). Two momentary contact push buttons, a volume control rheostat with an integral battery power switch, a miniature speaker, and a phone jack are mounted within the housing and are attached to the PCB by wires.

Figure 5:
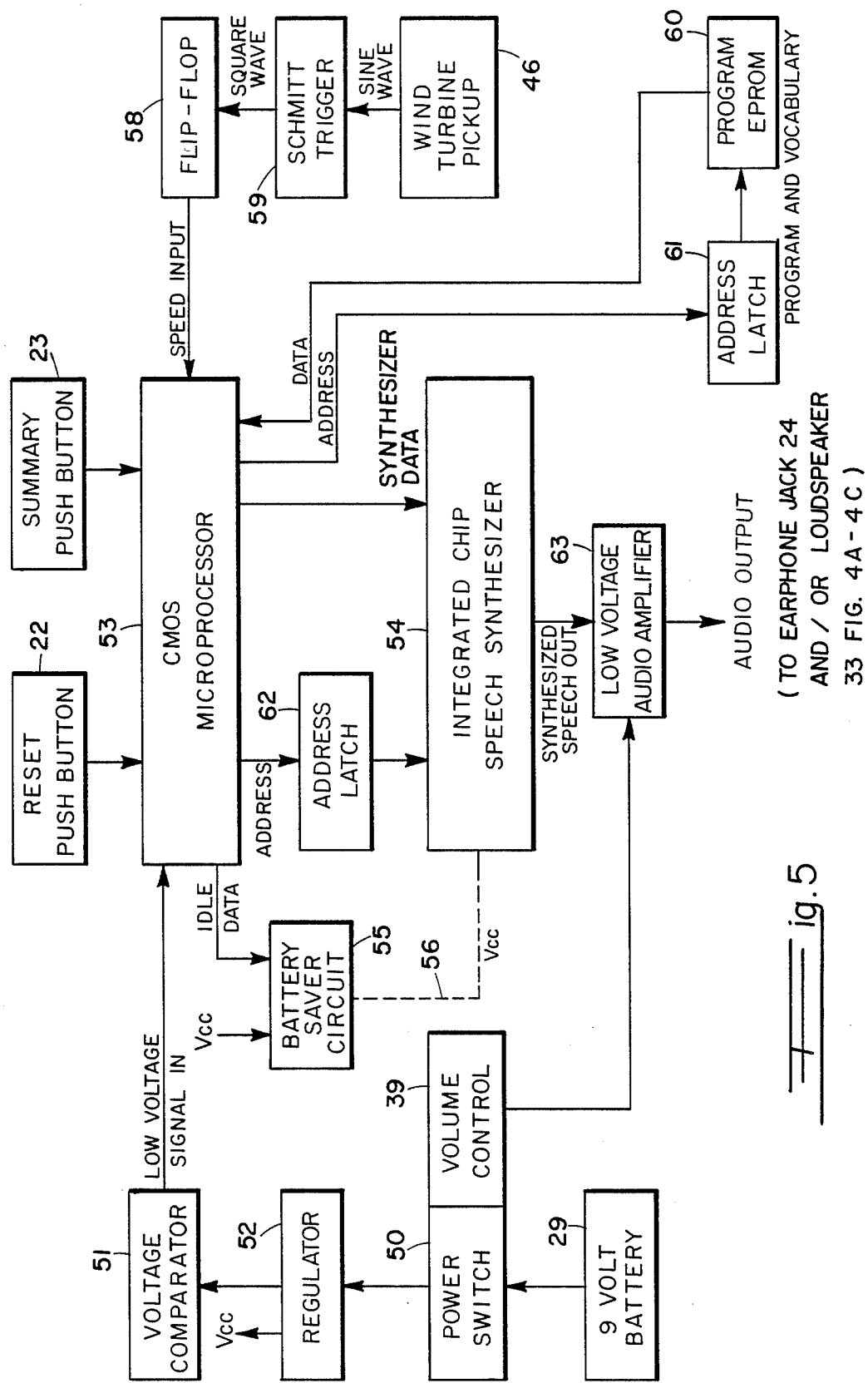
FIG. 5 is a simplified, block diagram of the circuitry of the velocity-measuring device constructed in accordance with the present invention.

Turning to FIG. 5, the circuitry of the velocity-measuring device of the present includes a power supply and low battery detector section, a speed encoder section, a microprocessor section, including an EPROM and address latch, and a speech synthesizer section, including an address latch, audio amplifier and sound producer (earphones or loudspeaker).

As shown in FIG. 5, the low battery detector section is illustrated as a voltage comparator 51 which receives its input voltage from the voltage regulator 52 operatively arranged to supply to other circuit components a regulated d.c. operating voltage $V_{cc}$. A power switch 50, which is mechanically ganged to the volume control rheostat 39 (also visible in FIG. 4C), is provided for connecting the nine (9) volt battery 29 (also shown in FIG. 4C) to the voltage regulator 52 as its input.

Figure 6A:
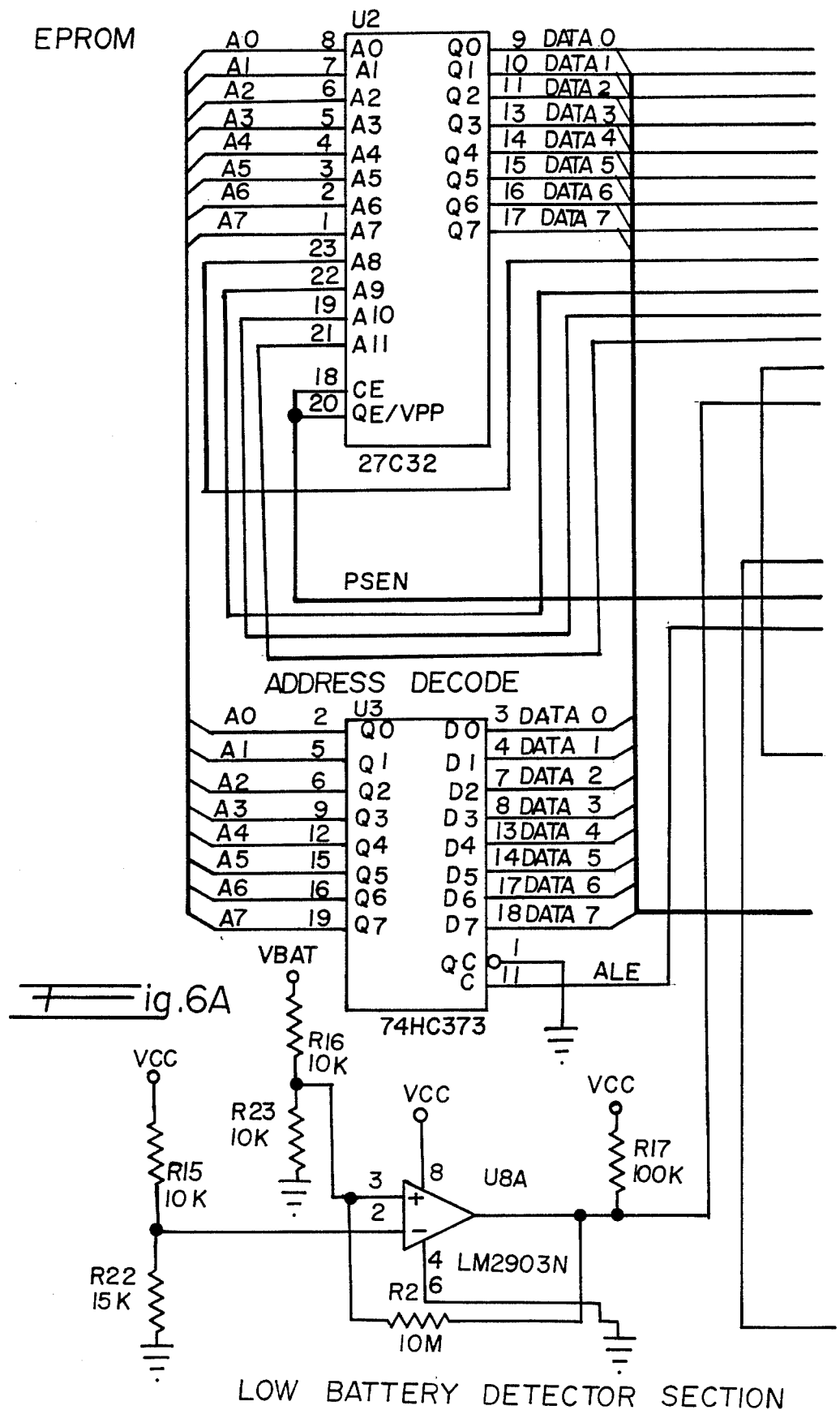
FIGS. 6A and 6B are, when taken together, a detailed schematic circuit diagram of the velocity-measuring device which may be used to carry out the present invention.
Figure 6D:
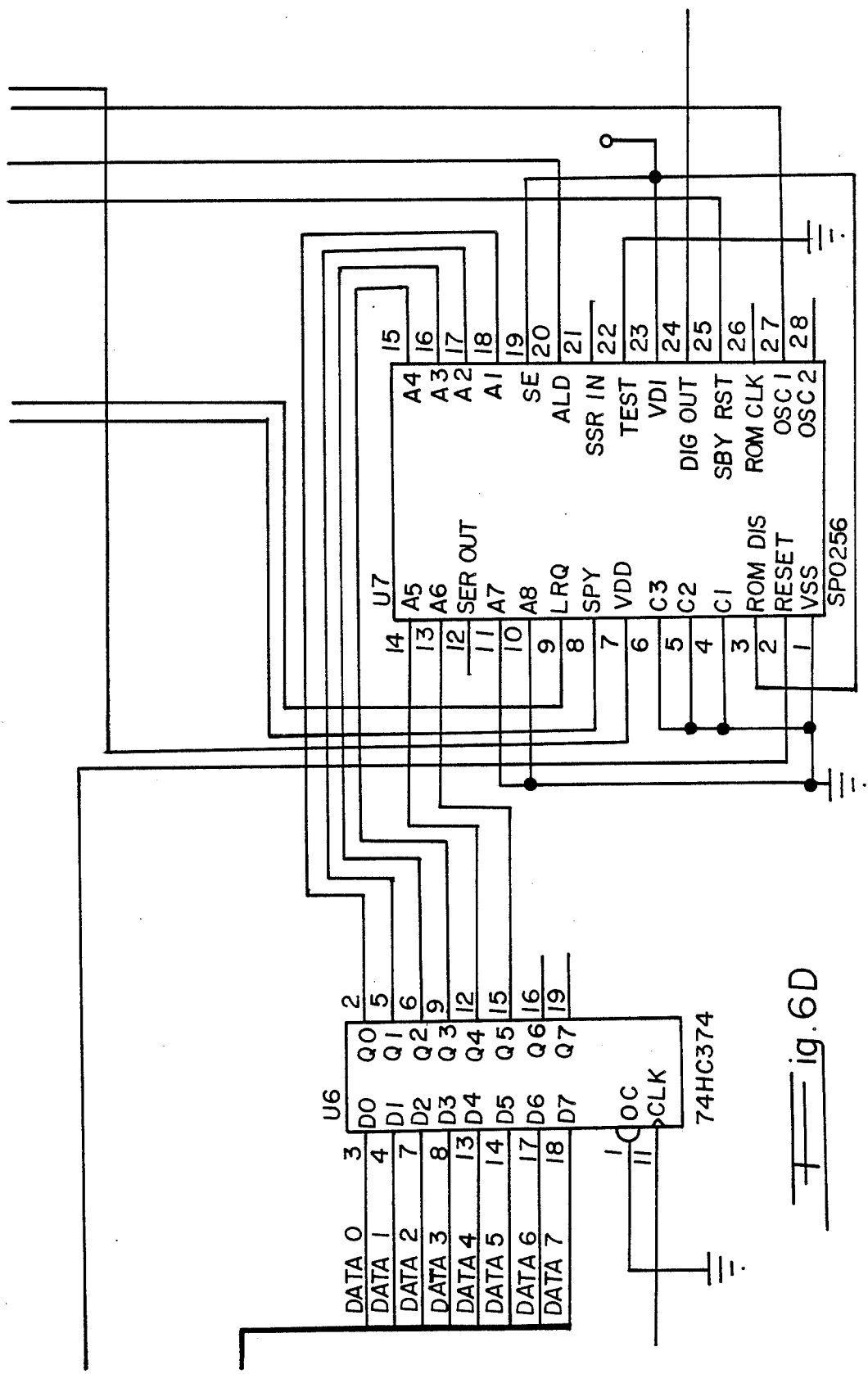
Figure 6E:
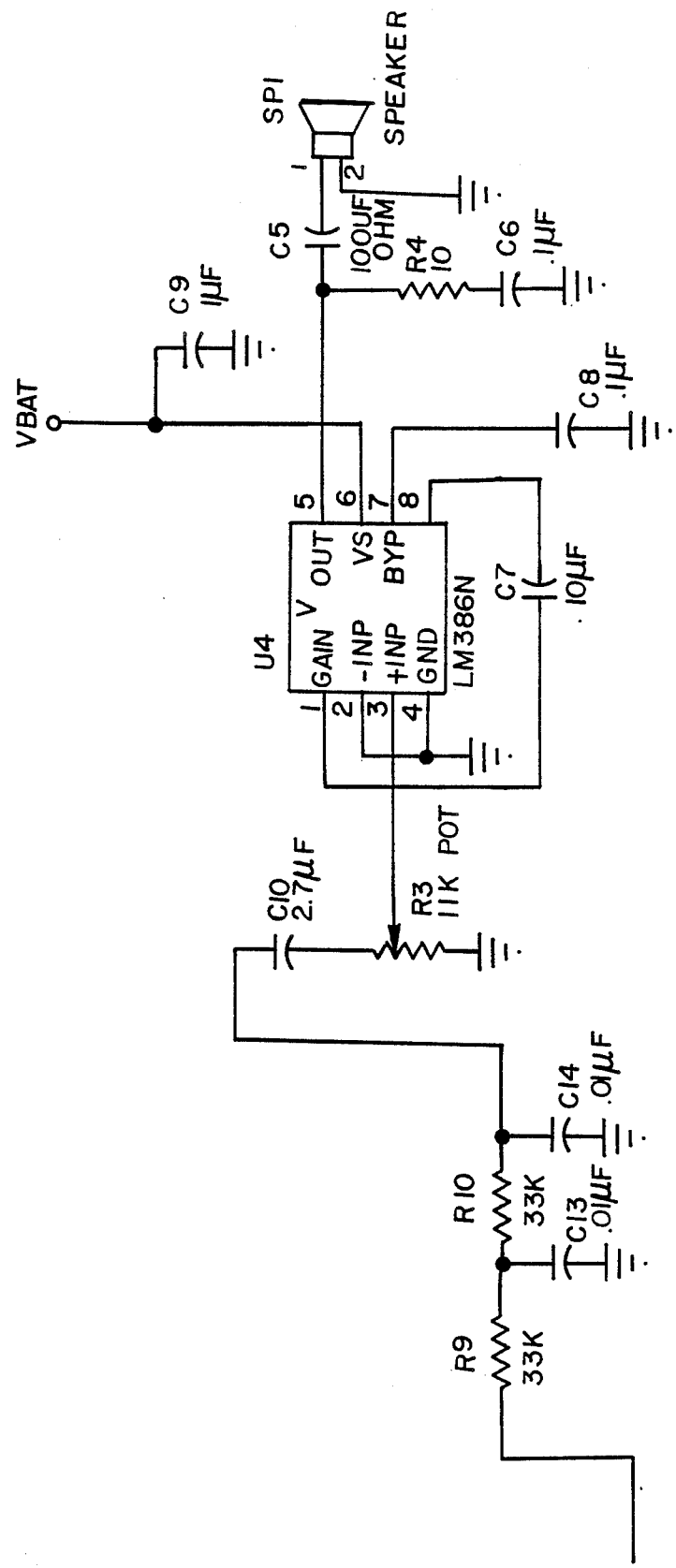
Figure 6F:
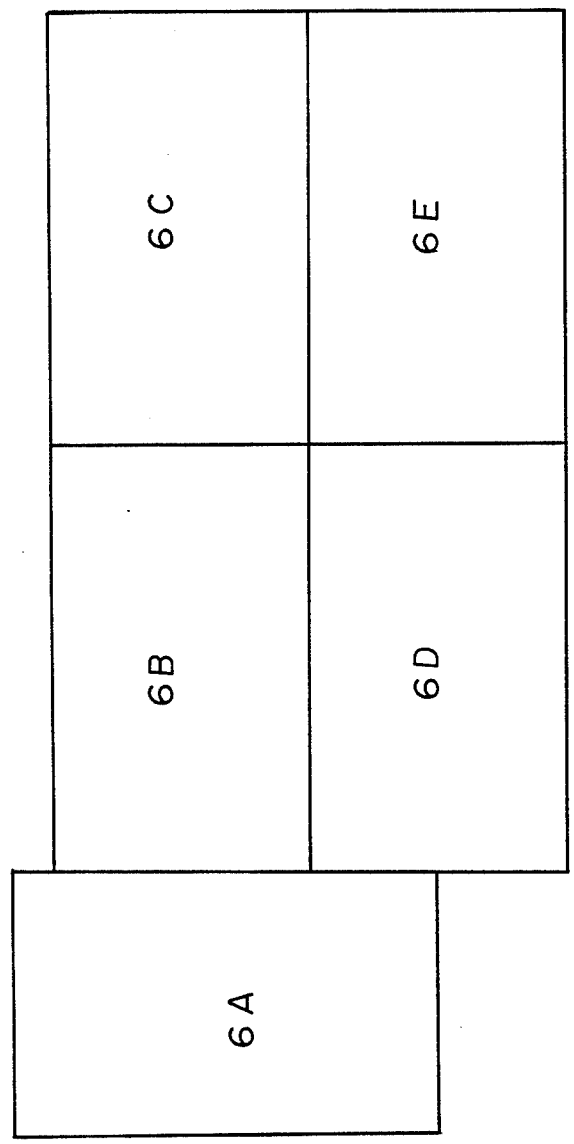

The voltage regulator 52 functions to keep $V_{cc}$ at a given regulated level over a range of input voltage, thus assuring that the voltage level of the battery 29 need not be exact and that the velocity-measuring device will operate properly, event when the terminal voltage of the battery 29 falls as its charge is reduced or it ages. Whenever the terminal voltage of the battery 29 falls to a level insufficient to supply the voltage regulator 52 or lower, as reflected in the voltage supplied to the voltage comparator 51, the voltage comparator produces a low voltage signal which is supplied to a microprocessor 53, which may be as shown in FIGS. 6A, 6B a 80C40 CMOS microprocessor running at 9.36 MHz. It is to be understood that other microprocessors could be used, as well. The microprocessor 53 monitors the two operator actuated push buttons 22 and 23, and performs all timing, counting and calculating functions in real-time.

The voltage regulator 52 supplied operating voltage $V_{cc}$ to all the active circuit components, as is conventional. One of these components includes an integrated circuit speech synthesizer 54, which is an allophone synthesizer and receives its power input via a battery saver circuit 55 and lead 56, only when the microprocessor 53 calls upon the synthesizer to produce an output. The battery saver circuit 55 acts as a controlled switch supplying $V_{cc}$ to the speech synthesizer 54 whenever an enabling signal is received from the microprocessor 53 on its idle data output lead. The software used contains all allophones and builds phrases under control of he microprocessor 53.

The microprocessor 53 provides one output in the form of control signal to a transistor-switch comprising the battery saver circuit 55 controlling battery power to the voice synthesis circuit 54. The power to this circuit is turned off during idle voice synthesis periods of greatly extend battery life. Because the remaining components have minimal power requirements automatic power control for them is not necessary.

The CMOS microprocessor 53 is provided with velocity input data from the speed encoding section which includes a wind (air flow) turbine pickup 46 (also shown in FIG. 4C). The pickup 46 may be a winding responsive to the charging magnetic field associated with the traveling magnets 44 and 45 (FIG. 4C). The output from the wind turbine pickup 46 is approximately a pulse train having a frequency which varies substantially linearly and directly with respect to the angular velocity of the turbine blades 30 (FIG. 4C) and thus represents the current velocity of air flow through the turbine. The pulse train output from the pickup 46 is fed to a Schmitt trigger circuit 57 having its output coupled to a flip-flop circuit 58. A train of pulses having a repetition rate substantially directly proportional to velocity is produced by the flip-flop circuit 58 and supplied, as velocity (speed) data, to the CMOS microprocessor 53. The microprocessor 53 is provided with a program on one of its data lines from a programmed EPROM 60 which is controlled by the microprocessor 53 via an address latch 61. The program supplied from the EPROM 60 may take many forms and be conveniently written in a selected one of a number of languages. In a realized embodiment of the invention, a wiring diagram of which is illustrated in FIGS. 6A-6B, the EPROM 60 was programmed, using assembly language, for 8048 and relatives. A computer-based print out of an exemplary program and source code is incorporated hereinbelow as Appendix A. The wiring diagram in FIGS. 6A-6B includes part designations and component values, allowing those skilled in the art to construct the exemplary circuit of the present invention, without difficulty. As an aid to those skilled in the art who may wish to use the source code set out in Appendix A, a symbol table is set out hereinbelow as Appendix B.

A second output from the microprocessor 53 is fed as a controlling input to the speech synthesizer data input terminal of the speech synthesizer 54. An address input is supplied to the synthesizer 54 via an address latch 62 under control of the microprocessor 53. The speech synthesizer 54 produces an output in the form of synthesized voice sounds which are fed to a low voltage amplifier 63 which amplifies the speech output and supplies it to the earphone jack 24 and/or loudspeaker 33 (FIGS. 4A-4C).

The microprocessor 53 executes one another of two program segments depending on whether the reset push button 22 or the summary push button 23 has been pushed and, in the even a low battery voltage signal is received from the voltage comparator 51, a special program segment calling for the synthesizer 54 to produce an audio output which indicates in verbal terms that the battery 29 is too low to assure that the velocity measuring device can operate accurately.

The major output function of the microprocessor 53 is to control the speech synthesis process. All of the input signal monitoring, timing, conversion, and calculation functions of the microprocessor 53 eventually result in internal numeric variables to be outputted to the user. The microprocessor 53 converts these numeric variables into signals that are compatible with the speech synthesizer 54 by utilizing vocabulary and speech sound lookup tables and related information included in program memory of the EMPROM 60. The microprocessor 53 interacts with the speech synthesizer 54 via a latched output bus and interrupt lines required by the speed synthesizer, the microprocessor 53 outputs each in proper sequence and timing to the speech synthesizer 54, which actually generates the electronic speech signal.

In ski mode, the program provides for audible numbers (0-99) representing current speed at intervals of five seconds. In summary mode, audible numbers indicating average speed (0-99), maximum speed (0-99), elapsed time (minutes:seconds), and distance covered (tenths of a mile) for the previous run are provided along with audible descriptive labels.

In addition, "ready" and "set-go" outputs are provided at power-up and reset respectively to cue the user. The "battery low" output is provided when the battery voltage drops below about five bolts. All calculations and audible outputs are under software control, and can therefore be modified through programming changes. Inasmuch as an allophone speech synthesizer is employed and it can synthesize any words and phrases, the device can easily be reconfigured to speak different units (such as, kilometers per hour) or even to calculate and/or announce different parameters; e.g. "safe speed exceeded". The device could produce its audio output in languages other than English, for example, German, French and the like, by reprogramming.

The output from the speech synthesizer 54 is fed to the miniature speaker 33 (FIG. 4C) and earphone jack (FIGS. 4A-4C) via a low voltage audio amplifier 63. The volume of the output is controlled by the operator via the volume control rheostat 39.

It is to be understood that the foregoing description of the preferred embodiments of invention and the accompanying illustrations thereof have been set out by way of example, not by way of limitation. Numerous other embodiments and variants of of the invention are possible without departing from the spirit and scope of the invention, its scope being defined in the appended claims.

APPENDIX A
SOURCE CODE

```
;       THIS IS THE MAIN SOURCE MODULE FOR THE VOICE SYNTHESIZED SKI SPEEDOMETER.
;       IT PROVIDES THE FOLLOWING ROUTINES:
;
;               MONITOR : CONTROLS REAL TIME FUNCTIONS
;
;               INITIALIZATION : POWER UP AND INITIALIZATION OF
;               RAM
;
;               ARITHMETIC LIBRARY : TWO BYTE MULTIPLY, BCD TO BINARY, BINARY TO BCD
;
;               REAL TIME CLOCK; PRESUMES 4.608 MHZ CLOCK !
;_____
;
;       PROGRAM EQUATES:
;
;_____
;
;
;       REGISTER EQUATES:
;
;
;                       RB0:
;
0C02            AEX     EQU     R2
0C03            TMP1    EQU     R3
0C04            TMP2    EQU     R4
0C05            COUNT   EQU     R5
0C06            LOOP    EQU     R6
0C07            BANK    EQU     R7
                ;
                ;               RB1:
                ;
```

```
        ;
        ;               TIMER
        ;
        ;AEX    EQU     R2
CC03    JREG    EQU     R3
CC04    TREG    EQU     R4
        ;
        ;               'STACK'
        ;
0C07    SAVE    EQU     R7
        ;
        ;_____
        ;
        ;       RAM DEFINITIONS:
        ;
        ;
0020                    ORG     20H
        ;
        ;_____
        ;
0020    RAMSTRT         EQU     $
        ;
        ;       RAM DEFINITIONS
        ;
0020    CTLFLG:         DS      1       ; PROGRAM CONTROL FLAGS
        ;
        ;               CTLFLG EQUATES:
        ;
0001    VCNTCPL         EQU     1H      ; VANE COUNT COMPLETED
0080    KBCMFL          EQU     80H     ; KBD COMMAND NOT YET EXECUTED
0002    WORDFL:         EQU     2H      ; WORD QUEUED; NOT UTTERED
0004    SPKFLG          EQU     4H      ; 5 SECOND SPEAK FLAG
        ;
        ;_____
        ;
0021    MSCREG:         DS      4       ; 4 MISC. REGISTERS
        ;_____
0025    BCDBUF:         DS      1
0026    NUMBUF1:        DS      1       ; ASCII OF ABOVE
0027    NUMBUF2:        DS      1
0028    NUMBUF3:        DS      1
0029    NUMBUF4:        DS      1
        ;
002A    MSGREG          DS      1       ; CONTAINS LOW BYTE OF CURRENT MESSAGE LABEL
002B    TMPREG:         DS      4       ; TEMPORARY STORAGE FOR CALCS
        ;
        ;
002F    DATAPTR         DS      1       ; POINTER FOR DATA SCROLL
0030    BINBUF:         DS      1       ; BINBUF INTO PACKED BCD IN BCDBUF
0031    HEXBUF:         DS      2       ; BUFFER FOR ASCII OUT OF BINHEX
0033    VANECTR:        DS      2       ; NUMBER OF VANE COUNTS
0035    VANECNT:        DS      2       ; NUMBER COUNTED 1 SEC
0037    SPD:            DS      2       ; CURRENT COMPUTED SPEED
0039    SPDSUM:         DS      2       ; SUM OF ALL SPEEDS SPOKEN
003B    SUMCNT:         DS      2       ; NUMBER OF SPOKEN SPEEDS
003D    SPDAVG:         DS      1       ; SPDSUM / SUMCNT
003E    MAXSPD:         DS      1       ; STORES MAXIMUM SPEED
003F    RTCLMN:         DS      1       ; RT CLOCK MINUTES
0040    RTCL5SC:        DS      1       ; RTCLK 5 SEC BLOCKS
```

```
0041        RTCLSC:     DS      2       ; "     " SECONDS
0043        RTCLIT:     DS      1       ; "     " TIMER INTERRUPTS; 10 MSEC.
0044        MSEC10:     DS      1       ; "     " # OF 10 MSEC INTRS.
0045        MSEC100:    DS      1       ; "     " # OF MSEC10 INTRS
0046        DISTNC:     DS      2       ; STORES LENGTH OF RUN DATA
0048        MILE:       DS      1       ; # OF MILES
0049        TENTH:      DS      1       ; TENTHS OF A MILE
004A        TENTH1:     DS      1
004B        TENTH2:     DS      1
004C        MILSUM:     DS      2
004E        CONST:      DS      2

0050        RESTRT:     DS      1       ; SET WHEN 'START' PUSHED;CHECKED BY 'END'
0051        VALMIL:     DS      2       ; STORES NUMBER TO DIVIDE INTO DISTNC
            ;
            ;           KEYBOARD REGISTERS
            ;
0053        KBCTR:      DS      1       ; COUNTS PASSES
0054        ROW:        DS      1       ; HOLDS KEYBOARD READ
0055        KBENTR:     DS      1       ; HOLDS KEYBOARD ENTRY
            ;
            ;           SPO256 REGISTERS
            ;
0056        NUMREG:     DS      1       ; HOLDS ADDRESS OF NUMBER IN 'NUMTAB
0057        WRDREG:     DS      1       ; HOLDS ADDRESS OF WORD IN MSGTAB
0058        ALLBUF:     DS      1       ; HOLDS CURRENT ALLOPHONE ADDRESS
0059        ALLCTR:     DS      1       ; ALLOPHONE COUNTER IN CURRENT WORD
            ;
005A        RAMTOP      EQU     $
;-----------------------------------------------------------------
            ;
005A        GENEQU      EQU     $
            ;
            ;           GLOBAL PROGRAM EQUATES
            ;
            ;           ** GENERAL EQUATES **
            ;
000F        LOMASK  EQU     0FH
00F0        HIMASK  EQU     0F0H
            ;
00FF        EOT     EQU     0FFH
000D        CR      EQU     0DH
0001        HALT    EQU     1H
0008        INTAK   EQU     8H
00EF        SPOON   EQU     0EFH
0020        LOBAT   EQU     20H
;-----------------------------------------------------------------
            ;
            ;           TIMER EQUATES:
            ;
003D        TENMSEC:    EQU     LOW     -195
;-----------------------------------------------------------------
005A        SPOEQU:
            ;
            ;       SPO-256 SPEECH PROCESSOR ALLOPHONE EQUATES
            ;
0000        PA1     EQU     0H              ; 10 MSEC PAUSE
0001        PA2     EQU     1H              ; 30 MSEC
0002        PA3     EQU     2H              ; 50 MSEC
0003        PA4     EQU     3H              ; 100 MSEC
```

| | | | | | |
|---|---|---|---|---|---|
| 0004 | PA5 | EQU | 4H | ; | 200 MSEC |
| 0005 | OY | EQU | 5H | ; | bOY |
| 0006 | AY | EQU | 6H | ; | skY |
| 0007 | EH | EQU | 7H | ; | End |
| 0008 | KK3 | EQU | 8H | ; | Comb |
| 0009 | PP | EQU | 9H | ; | Pow |
| 000A | JH | EQU | 0AH | ; | dodGE |
| 000B | NN1 | EQU | 0BH | ; | thiN |
| 000C | IH | EQU | 0CH | ; | sIt |
| 000D | TT2 | EQU | 0DH | ; | To |
| 000E | RR1 | EQU | 0EH | ; | Rural |
| 000F | AX | EQU | 0FH | ; | suCCeed |
| 0010 | MM | EQU | 10H | ; | Milk |
| 0011 | TT1 | EQU | 11H | ; | parT |
| 0012 | DH1 | EQU | 12H | ; | tHey |
| 0013 | IY | EQU | 13H | ; | sEE |
| 0014 | EY | EQU | 14H | ; | bEIge |
| 0015 | DD1 | EQU | 15H | ; | coulD |
| 0016 | UW1 | EQU | 16H | ; | tO |
| 0017 | AO | EQU | 17H | ; | OUght |
| 0018 | AA | EQU | 18H | ; | hOt |
| 0019 | YY2 | EQU | 19H | ; | Yes |
| 001A | AE | EQU | 1AH | ; | hAt |
| 001B | HH1 | EQU | 1BH | ; | He |
| 001C | BB1 | EQU | 1CH | ; | Business |
| 001D | TH | EQU | 1DH | ; | THin |
| 001E | UH | EQU | 1EH | ; | bOOk |
| 001F | UW2 | EQU | 1FH | ; | fOOd |
| 0020 | AW | EQU | 20H | ; | OUt |
| 0021 | DD2 | EQU | 21H | ; | Do |
| 0022 | GG3 | EQU | 22H | ; | wiG |
| 0023 | VV | EQU | 23H | ; | Vest |
| 0024 | GG1 | EQU | 24H | ; | Got |
| 0025 | SH | EQU | 25H | ; | SHip |
| 0026 | ZH | EQU | 26H | ; | aZUre |
| 0027 | RR2 | EQU | 27H | ; | bRain |
| 0028 | FF | EQU | 28H | ; | Food |
| 0029 | KK2 | EQU | 29H | ; | sKy |
| 002A | KK1 | EQU | 2AH | ; | Can't |
| 002B | ZZ | EQU | 2BH | ; | Zoo |
| 002C | NG | EQU | 2CH | ; | aNCHor |
| 002D | LL | EQU | 2DH | ; | Lake |
| 002E | WW | EQU | 2EH | ; | Wool |
| 002F | XR | EQU | 2FH | ; | repaIR |
| 0030 | WH | EQU | 30H | ; | WHig |
| 0031 | YY1 | EQU | 31H | ; | Yes |
| 0032 | CH | EQU | 32H | ; | CHurch |
| 0033 | ER1 | EQU | 33H | ; | fIR |
| 0034 | ER2 | EQU | 34H | ; | fIR |
| 0035 | OW | EQU | 35H | ; | beAU |
| 0036 | DH2 | EQU | 36H | ; | tHEy |
| 0037 | SS | EQU | 37H | ; | veSt |
| 0038 | NN2 | EQU | 38H | ; | No |
| 0039 | HH2 | EQU | 39H | ; | Hoe |
| 003A | ORR | EQU | 3AH | ; | stORe |
| 003B | AR | EQU | 3BH | ; | alArm |
| 003C | YR | EQU | 3CH | ; | clEAR |
| 003D | GG2 | EQU | 3DH | ; | Guest |
| 003E | EL | EQU | 3EH | ; | saddLE |
| 003F | BB2 | EQU | 3FH | ; | Business |

```
00F1        S1:         EQU     0F1H
00F2        S2:         EQU     0F2H
00F3        S3:         EQU     0F3H
00F4        S4:         EQU     0F4H
00F5        S5:         EQU     0F5H
00F6        S6:         EQU     0F6H
00F7        S7:         EQU     0F7H
00F8        S8:         EQU     0F8H
00F9        S9:         EQU     0F9H
00FA        S10:        EQU     0FAH
00FB        S11:        EQU     0FBH
00FC        S12:        EQU     0FCH
00FD        S13:        EQU     0FDH
00FE        S14:        EQU     0FEH
            ;
            ;
            ;           CONTROL EQUATES OUT OF P1
            ;
FFFB        ALD:        EQU     NOT 4H
            ;
            ;           INPUTS IN P1
            ;
            ;           BIT         MEANS
            ;
            ;           0           LRQ     ; HIGH = SPO BUFFER FULL
            ;           1           SBY     ; LOW = SPO STILL SPEAKING
            ;           6           START   ; HIGH = START THE TIMER AND SPEAK ROUTINE
            ;           7           END     ; HIGH = END THE TIMER, ANNOUNCE ROUTINE
            ;
            ;           OUTPUTS FROM P1
            ;
            ;           2           ALD     ; LOW = PULSE LOADS ALLOPHONE ADDRESS TO SPO
            ;           3           SET     ; HIGH = SETS FLIP-FLOP
            ;           4           VDD     ; HIGH = TURNS OFF THE SPO
            ;
            ;           INPUTS IN P2
            ;
            ;           5           BATT    ; LOW = LOW BATTERY
            ;
            ;           OUTPUTS FROM P2
            ;
            ;           4           RESET   ; LOW = LOW PULSE RESETS SPO
            ;
00C0        ALLMSK      EQU     11000000B
            ;
            ;----------------------------------------
            ;
005A        CODSTRT     EQU     $
            ;
            ;           CODE STARTS HERE
            ;
0000                    ORG     0
            ;
0000        RESET:
0000 8400               JMP     INIT
            ;
            ;----------------------------------------
            ;
0003                    ORG     3H
            ;
```

```
0003            INTR:                   ; EXTERNAL INTERRUPT SERVICE
0003 D5                 SEL     RB1
0004 040E               JMP     INTSVC
                ;
                ;——————————————————————————————————————————
                ;
0007                    ORG     7H
                ;
0007            TIMER:                  ; TIMER INTERRUPT SERVICE
0007 D5                 SEL     RB1
0008 AA                 MOV     AEX,A           ; ACCUMULATOR ON 'STACK'
                ;
                ;
0009 FC                 MOV     A,TREG
000A 62                 MOV     T,A
000B FB                 MOV     A,JREG
000C B3                 JMPP    @A
                ;——————————————————————————————————————————
000D 1B         JREALT: DB      RCLK
                ;——————————————————————————————————————————
                ;
                ;
                ;
000E            INTSVC:
000E AA                 MOV     AEX,A
                ;
                ;       ACKNOWLEDGE INTR
                ;
000F 8908               ORL     P1,#INTAK
0011 99F7               ANL     P1,#NOT INTAK
                ;
0013 B833               MOV     R0,#VANECTR
0015 9495               CALL    DBLINC
                ;
                ;
0017            GLITCH:
0017 FA                 MOV     A,AEX
0018 8618               JNI     $
001A 93                 RETR
                ;——————————————————————————————————————————
                ;
                ;       REAL TIME CLOCK:
                ;
001B            RCLK:
001B B418               CALL    KBSCAN
                ;
001D 0425               JMP     TNMSEC
                ;
001F BB0D       RTRET:  MOV     JREG,#JREALT
0021 BC3D               MOV     TREG,#TENMSEC
0023 FA                 MOV     A,AEX           ; POP A
0024 93                 RETR
0025            TNMSEC:
0025 B844               MOV     R0,#MSEC10
0027 10                 INC     @R0
0028 F0                 MOV     A,@R0
0029 D332               XRL     A,#50
002B C62F               JZ      HUNMSEC
002D 041F               JMP     RTRET
                ;
```

```
002F            HUNMSEC:
002F B844               MOV     R0,#MSEC10
0031 B000               MOV     @R0,#0
                ;
                ;
                ;       GET VANE INTERRUPT COUNT
                ;
0033 B833               MOV     R0,#VANECTR
0035 B935               MOV     R1,#VANECNT
0037 94D8               CALL    DBLMOV
                ;
                ;       REZERO COUNTER
                ;
0039 B000               MOV     @R0,#0
003B 18                 INC     R0
003C B000               MOV     @R0,#0
                ;
                ;       SET FLAG
                ;
003E B820               MOV     R0,#CTLFLG
0040 F0                 MOV     A,@R0
0041 4301               ORL     A,#VCNTCPL
0043 A0                 MOV     @R0,A
                ;
                ;
0044 B845               MOV     R0,#MSEC100
0046 10                 INC     @R0
0047 F0                 MOV     A,@R0
0048 D302               XRL     A,#2
004A C64E               JZ      RTSEC
004C 004C 041F               JMP     RTRET
004E            RTSEC:
                ;
004E B845               MOV     R0,#MSEC100
0050 B000               MOV     @R0,#0
0052 B841               MOV     R0,#RTCLSC
0054 10                 INC     @R0
0055 F0                 MOV     A,@R0
0056 D305               XRL     A,#5
0058 961F               JNZ     RTRET
                ;
005A B000               MOV     @R0,#0
                ;
005C B820               MOV     R0,#CTLFLG
005E F0                 MOV     A,@R0
005F 4304               ORL     A,#SPKFLG
0061 A0                 MOV     @R0,A
0062            RTSEC1:
0062 97                 CLR     C
0063 B840               MOV     R0,#RTCL5SC
0065 10                 INC     @R0
0066 F0                 MOV     A,@R0
0067 D30C               XRL     A,#12
0069 C66D               JZ      RTMIN
006B 041F               JMP     RTRET
                ;
006D B000     RTMIN:     MOV     @R0,#0
006F B83F               MOV     R0,#RTCLMN
```

```
0071 10              INC     @R0
0072 F0              MOV     A,@R0
0073 97              CLR     C
0074 F0              MOV     A,@R0
0075 03C4            ADD     A,#-60
0077 F67B            JC      RTROLL
                ;
                ;
0079 041F    RCK1:   JMP     RTRET
007B B000    RTROLL: MOV     @R0,#0
007D 041F            JMP     RTRET
                ;
                ;_____
                ;                         ; LOAD CALCULATION RESULT INTO @R0 LOCATION
                ;_____
                ;
                ; KEYBOARD COMMAND HANDLER
                ;
                ;       ENTER WITH KEYPRESSED IN KBENTR
                ;
                ;       EXIT THROUGH APPROPRIATE ROUTINE
                ;
007F         KBCMD:
                ;
                ;       COMMAND EXECUTED YET?
                ;
007F B820            MOV     R0,#CTLFLG
0081 F0              MOV     A,@R0
0082 F285            JB7     DOKBCM
0084 83              RET
0085         DOKBCM:
0085 B855            MOV     R0,#KBENTR
0087 238B            MOV     A,#LOW KEYTAB
0089 60              ADD     A,@R0
008A B3              JMPP    @A
                ;
                ;
008B         KEYTAB:
008B 8D              DB      SJMP
008C AD              DB      EJMP
                ;
                ;
008D         SJMP:
008D B493            CALL    CLRKBF
008F B850            MOV     R0,#RESTRT
0091 B001            MOV     @R0,#1
0093 233D            MOV     A,#TENMSEC
0095 62              MOV     T,A
0096 25              EN      TCNTI
0097 55              STRT    T
                ;
0098 99EF            ANL     P1,#SPOON       ; TURNS ON SPO
009A 9AEF            ANL     P2,#SPOON       ; RESETS SPO
009C 8A10            ORL     P2,#NOT SPOON
009E B857            MOV     R0,#WRDREG
00A0 B000            MOV     @R0,#LOW SETGO
00A2 D495            CALL    WORDSEND
00A4         SJMPL:
00A4 09              IN      A,P1            ; LOOP TURNS OFF SPO
00A5 32A9            JB1     OKSBY
```

```
00A7 04A4            JMP     SJMPL
00A9        OKSBY:
00A9 8910            ORL     P1,#NOT SPOON
00AB A49A            JMP     START
00AD        EJMP:
00AD 65              STOP    TCNT
00AE 35              DIS     TCNTI
00AF B493            CALL    CLRKBF
00B1 B850            MOV     R0,#RESTRT
00B3 F0              MOV     A,@R0
00B4 D301            XRL     A,#1
00B6 C6B9            JZ      STRTCHK
00B8 83              RET
00B9        STRTCHK:
00B9 99EF            ANL     P1,#SPOON          ; TURNS ON SPO
00BB 9AEF            ANL     P2,#SPOON          ; RESETS SPO
00BD B805            MOV     R0,#COUNT
00BF B001            MOV     @R0,#1
00C1 94D1            CALL    DELAY
00C3 8A10            ORL     P2,#NOT SPOON
00C5 C400            JMP     END
;────────────────────────────────────────────
0100                 ORG     100H
;────────────────────────────────────────────
0100        AVGSPD:
0100 B835            MOV     R0,#VANECNT
0102 9456            CALL    DBLSHF
0104 E609            JNC     DBLSHF2
0106 0301            ADD     A,#1
0108 A0              MOV     @R0,A
0109        DBLSHF2:
0109 9456            CALL    DBLSHF
010B E610            JNC     SPDH
010D 0301            ADD     A,#1
010F 97              CLR     C
0110        SPDH:
0110 B837            MOV     R0,#SPD
0112 A0              MOV     @R0,A
             ;
             ;             FINDS THE MAXIMUM SPEED
             ;             JUMPS OUT IF SPEED = 0
             ;
0113 D300            XRL     A,#0
0115 C628            JZ      SPDH0
0117 B837            MOV     R0,#SPD
0119 F0              MOV     A,@R0
011A B83E            MOV     R0,#MAXSPD
011C 37              CPL     A
011D 0301            ADD     A,#1
011F 60              ADD     A,@R0
0120 F628            JC      SPDH0
0122 B837            MOV     R0,#SPD
0124 F0              MOV     A,@R0
0125 B83E            MOV     R0,#MAXSPD
0127 A0              MOV     @R0,A
0128        SPDH0:
0128 B837            MOV     R0,#SPD
012A F0              MOV     A,@R0
012B 3487            CALL    SPKSPD1
012D        SPDH1:                        ;GENERAL ROUTINE TO CONVERT 'SPD' TO SPEAKABLE FORM
```

```
012D B837           MOV     R0,#SPD
012F F0             MOV     A,@R0
0130 03EC           ADD     A,#-20
0132 E658           JNC     AVGSPD1
0134        SPDH2:
0134 B837           MOV     R0,#SPD
0136 F0             MOV     A,@R0
0137 B830           MOV     R0,#BINBUF
0139 A0             MOV     @R0,A
013A 9460           CALL    BINBCD
013C B825           MOV     R0,#BCDBUF
013E F0             MOV     A,@R0
013F 53F0           ANL     A,#HIMASK
0141 47             SWAP    A
0142 B837           MOV     R0,#SPD
0144 A0             MOV     @R0,A
0145 2395           MOV     A,#LOW SPDTAB
0147 0312           ADD     A,#18
0149 347D           CALL    SPKSPD
014B B825           MOV     R0,#BCDBUF
014D F0             MOV     A,@R0
014E 530F           ANL     A,#LOMASK
0150 B837           MOV     R0,#SPD
0152 A0             MOV     @R0,A
0153 D300           XRL     A,#0
0155 9658           JNZ     AVGSPD1
0157 83             RET
            ;
0158        AVGSPD1:
0158 2395           MOV     A,#LOW SPDTAB
015A 347D           CALL    SPKSPD
015C 83             RET
            ;
            ;
            ;       MAKE SOFTWARE DELAY OF 10 - 140 MSEC
            ;
015D        ALLDELY:
015D 530F           ANL     A,#0FH
015F AD             MOV     COUNT,A
0160        LOOP1:
0160 BCFF           MOV     TMP2,#0FFH
0162 00     LOOP2:  NOP
0163 00             NOP
0164 00             NOP
0165 00             NOP
0166 00             NOP
0167 00             NOP
0168 00             NOP
0169 00             NOP
016A 00             NOP
016B 00             NOP
016C 00             NOP
016D 00             NOP
016E 00             NOP
016F 00             NOP
0170 00             NOP
0171 00             NOP
0172 00             NOP
0173 00             NOP
0174 00             NOP
```

```
0175 00              NOP
0176 00              NOP
0177 00              NOP
0178 EC62            DJNZ    TMP2,LOOP2
017A ED60            DJNZ    COUNT,LOOP1
017C 83              RET
;─────────────────────────────────────────────────────
;
;       ROUTINE SPEAKS THE SPEED SENT BY AVGSPD
;
;       ENTRY:
;               SPEED IS IN 'SPD'; ADDRESS OF APPROPRIATE LOOKUP TABLE IN A
;
;       EXIT : NONE
;
017D        SPKSPD:
017D B837           MOV     R0,#SPD
017F 60             ADD     A,@R0
0180 A3             MOVP    A,@A
0181 B856           MOV     R0,#NUMREG
0183 A0             MOV     @R0,A
0184 D4BC           CALL    NUMSEND
0186 83             RET
0187        SPKSPD1:
0187 B839           MOV     R0,#SPDSUM
0189 B937           MOV     R1,#SPD
018B B40E           CALL    DBLADD
018D C8             DEC     R0
018E C9             DEC     R1
018F B400           CALL    LDBAK
0191 B83B           MOV     R0,#SUMCNT
0193 10             INC     @R0
0194 83             RET
;─────────────────────────────────────────────────────
0195        SPDTAB:
0195 00     ZEROJ:  DB      LOW ZERO
0196 05     ONEJ:   DB      LOW ONE
0197 0D     TWOJ:   DB      LOW TWO
0198 11     THREEJ: DB      LOW THREE
0199 18     FOURJ:  DB      LOW FOUR
019A 1D     FIVEJ:  DB      LOW FIVE
019B 23     SIXJ:   DB      LOW SIX
019C 2C     SEVENJ: DB      LOW SEVEN
019D 34     EIGHTJ: DB      LOW EIGHT
019E 39     NINEJ:  DB      LOW NINE
019F 3E     TENJ:   DB      LOW TEN
01A0 44     ELEVNJ: DB      LOW ELEVEN
01A1 4D     TWELVEJ:DB      LOW TWELVE
01A2 56     THIRTJ: DB      LOW THIRT
01A3 60     FOURTJ: DB      LOW FOURT
01A4 69     FIFTJ:  DB      LOW FIFT
01A5 73     SIXTJ:  DB      LOW SIXT
01A6 80     SEVTJ:  DB      LOW SEVT
01A7 8C     EIGHTNJ:DB      LOW EIGHTN
01A8 94     NINTJ:  DB      LOW NINT
01A9 9E     TWENTJ: DB      LOW TWENTY
01AA A8     THRTYJ: DB      LOW THIRTY
01AB AF     FORTYJ: DB      LOW FORTY
01AC B6     FIFTYJ: DB      LOW FIFTY
```

```
01AD BE         SIXTYJ: DB      LOW SIXTY
01AE C8         SEVNTJ: DB      LOW SEVENTY
01AF D2         EIGHTYJ:DB      LOW EIGHTY
01B0 D8         NINETYJ:DB      LOW NINETY
                ;
01B0            NUMTOP  EQU     $-1
                ;---------------------------------
0200                    ORG     200H
                ;---------------------------------
0200            DISSPK:
0200 B848               MOV     R0,#MILE
0202 F0                 MOV     A,@R0
0203 B837               MOV     R0,#SPD
0205 A0                 MOV     @R0,A
0206 342D               CALL    SPDH1
0208 B857               MOV     R0,#WRDREG
020A B034               MOV     @R0,#LOW POINT
020C D495               CALL    WORDSEND
020E B849               MOV     R0,#TENTH
0210 F0                 MOV     A,@R0
0211 B837               MOV     R0,#SPD
0213 A0                 MOV     @R0,A
0214 342D               CALL    SPDH1
0216 B857               MOV     R0,#WRDREG
0218 B02C               MOV     @R0,#LOW MILES
021A D495               CALL    WORDSEND
021C 83                 RET
                ;
021D            SCOND:
021D B840               MOV     R0,#RTCL5SC     ;COMPUTES THE NUMBER OF SECONDS
021F F0                 MOV     A,@R0
0220 B805               MOV     R0,#COUNT
0222 A0                 MOV     @R0,A
0223 27                 CLR     A
0224            ADDSEC:
0224 0305               ADD     A,#5
0226 ED24               DJNZ    COUNT,ADDSEC
0228 B841               MOV     R0,#RTCLSC
022A 60                 ADD     A,@R0
022B A0                 MOV     @R0,A
022C 83                 RET
                ;---------------------------------
                ;       RTCLMN X SPDAVG = MILSUM;  MILSUM / 60 = MILE
                ;       REMAINDER / 6 = TENTH1;  RTCLSC X SPDAVG = MILSUM
                ;       MILSUM / 360 = TENTH2;  TENTH1 + TENTH2 = TENTH
                ;       IF TENTH > 10, MILE INC 1 AND TENTH - 10 = TENTH
                ;
022D            DISCAL:
022D B83F               MOV     R0,#RTCLMN
022F F0                 MOV     A,@R0
0230 C667               JZ      TNTH2
0232 AD                 MOV     COUNT,A
0233 B93D               MOV     R1,#SPDAVG
0235 F1                 MOV     A,@R1
0236 B946               MOV     R1,#DISTNC
0238 A1                 MOV     @R1,A
0239 B84C               MOV     R0,#MILSUM
023B            SUMSPD:
023B B40E               CALL    DBLADD
023D C8                 DEC     R0
```

```
023E C9                DEC    R1
023F B400              CALL   LDBAK
0241 ED3B              DJNZ   COUNT,SUMSPD
0243        MILEL:
0243 B94E              MOV    R1,#CONST
0245 19                INC    R1
0246 B1FF              MOV    @R1,#0FFH
0248 C9                DEC    R1
0249 B1C4              MOV    @R1,#0C4H
024B B40E              CALL   DBLADD
024D C9                DEC    R1
024E C8                DEC    R0
024F B400              CALL   LDBAK
0251 B948              MOV    R1,#MILE
0253 11                INC    @R1
0254 F643              JC     MILEL
0256 F1                MOV    A,@R1
0257 03FF              ADD    A,#-1
0259 A1                MOV    @R1,A
025A F0                MOV    A,@R0
025B 033C              ADD    A,#60
025D 97                CLR    C
025E        TNTH1:
025E 03FA              ADD    A,#-6
0260 B94A              MOV    R1,#TENTH1
0262 11                INC    @R1
0263 C667              JZ     TNTH2
0265 F65E              JC     TNTH1
0267        TNTH2:
0267 B341              MOV    R0,#RTCLSC
0269 F0                MOV    A,@R0
026A AD                MOV    COUNT,A
026B B93D              MOV    R1,#SPDAVG
026D F1                MOV    A,@R1
026E B946              MOV    R1,#DISTNC
0270 A1                MOV    @R1,A
0271 19                INC    R1
0272 B100              MOV    @R1,#0
0274 C9                DEC    R1
0275 B84C              MOV    R0,#MILSUM
0277 B000              MOV    @R0,#0
0279 18                INC    R0
027A B000              MOV    @R0,#0
027C C8                DEC    R0
027D        SUMSPD2:
027D B40E              CALL   DBLADD
027F C8                DEC    R0
0280 C9                DEC    R1
0281 B400              CALL   LDBAK
0283 ED7D              DJNZ   COUNT,SUMSPD2
0285        TNTH2L:
0285 B94E              MOV    R1,#CONST
0287 B198              MOV    @R1,#98H
0289 19                INC    R1
028A B1FE              MOV    @R1,#0FEH
028C C9                DEC    R1
028D B40E              CALL   DBLADD
028F C8                DEC    R0
0290 C9                DEC    R1
0291 B400              CALL   LDBAK
```

```
0293 B94B            MOV     R1,#TENTH2
0295 11              INC     @R1
0296 F685            JC      TNTH2L
0298 F1              MOV     A,@R1
0299 03FF            ADD     A,#-1
029B A1              MOV     @R1,A
              ;
              ;     ROUND UP
              ;
029C B94E            MOV     R1,#CONST
029E B1C8            MOV     @R1,#0C8H
02A0 19              INC     R1
02A1 B100            MOV     @R1,#0
02A3 C9              DEC     R1
02A4 B40E            CALL    DBLADD
02A6 E6AB            JNC     TNTH3
02A8 B94B            MOV     R1,#TENTH2
02AA 11              INC     @R1
02AB         TNTH3:
02AB B94B            MOV     R1,#TENTH2
02AD F1              MOV     A,@R1
02AE B94A            MOV     R1,#TENTH1
02B0 61              ADD     A,@R1
02B1 B949            MOV     R1,#TENTH
02B3 A1              MOV     @R1,A
02B4 97              CLR     C
02B5 BD00            MOV     COUNT,#0
              ;
02B7         TNTHCY:
02B7 03F6            ADD     A,#-10
02B9 1D              INC     COUNT
02BA F6B7            JC      TNTHCY
02BC 030A            ADD     A,#10
02BE B849            MOV     R0,#TENTH
02C0 A0              MOV     @R0,A
02C1 CD              DEC     COUNT
02C2 FD              MOV     A,COUNT
02C3 B848            MOV     R0,#MILE
02C5 60              ADD     A,@R0
02C6 A0              MOV     @R0,A
02C7 83              RET
              ;_____
              ;
0300                 ORG     300H
              ;_____
              ;

0300         MSGTAB:
              ;
              ;     WORD LOOKUP TABLES FOR SPO-256
              ;
0300 37370702 SETGO:  DB     SS,SS,EH,PA3,TT2,PA4,GG1,OW,PA3,EOT
030A 0EFE0107 READY:  DB     RR1,S14,PA2,EH,EH,PA1,DD2,IY,PA5,EOT
0314 193A021A AVG:    DB     YY2,ORR,PA3,AE,VV,S14,ER1,IH,PA3,JH,PA3,EOT
0320 37020913 SPEED:  DB     SS,PA3,PP,IY,PA2,DD1,PA4,WW,AX,ZZ,PA3,EOT
032C 1006002D MILES:  DB     MM,AY,PA1,LL,PA1,ZZ,PA5,EOT
0334 09050B02 POINT:  DB     PP,OY,NN1,PA3,TT2,PA4,EOT
033B 120F013F BATT:   DB     DH1,AX,PA2,BB2,AE,PA3,TT2,ER1,IY,PA3,IH,ZZ,PA3,LL,OW,PA5,EOT
034C 193A0210 MAX:    DB     YY2,ORR,PA3,MM,AE,KK2,SS,IH,MM,AX,MM,PA3,EOT
0359 0D180610 TIME:   DB     TT2,AA,AY,MM,PA3,AX,FF,PA3,RR2,AX,NN1,PA3,WW,AX,ZZ,PA3,EOT
036A 100C0B0C MINUTE: DB     MM,IH,NN1,IH,PA1,TT1,PA3,EOT
```

```
0372 100C0B0C  MINUTES:DB      MM,IH,NN1,IH,PA1,TT2,ZZ,PA3,EOT
037B 37070029  SECND:  DB      SS,EH,PA1,KK2,AX,NN1,DD1,PA5,EOT
0384 37070029  SECNDS: DB      SS,EH,PA1,KK2,AX,NN1,DD1,ZZ,PA5,EOT
               ;
038D           MSGTOP  EQU     $-1

;―――――――――――――――――――――――――――――――――――――――――――――
0400                           ORG     400H
               ;―――――――――――――――――――――――――――――――――――――――――――――
               ;
               ;                               ; INITIALIZE PROGRAM — REBOOTING PROCESS
               ;
0400           INIT:   EQU     $
               ;                       ; CLEAR INTERNAL RAM
0400 27                CLR     A
0401 B858              MOV     R0,#RAMTOP-2
0403 B95A              MOV     R1,#RAMTOP
0405           INIT1:
0405 A1                MOV     @R1,A
0406 C9                DEC     R1
0407 E805              DJNZ    R0,INIT1
               ;
0409 D5        RTINIT: SEL     RB1
040A BB0D              MOV     JREG,#JREALT
040C BC3D              MOV     TREG,#TENMSEC
040E C5                SEL     RB0
               ;
040F 99F7              ANL     P1,#NOT INTAK   ; ENABLE FLIP-FLOP
0411 05                EN      I               ; OFF WE GO
               ;
0412 75                ENT0    CLK
               ;
0413 99EF              ANL     P1,#SPOON               ; TURNS ON SPO
0415 9AEF              ANL     P2,#SPOON               ; RESETS SPO
0417 B805              MOV     R0,#COUNT
0419 B001              MOV     @R0,#1
041B 94D1              CALL    DELAY
041D 8A10              ORL     P2,#NOT SPOON
               ;
041F 0A                IN      A,P2            ; CHECK BATTERIES
0420 B228              JB5     BATTOK
0422 B857              MOV     R0,#WRDREG
0424 B03B              MOV     @R0,#LOW BATT
0426 D495              CALL    WORDSEND
0428           BATTOK:
0428 B857              MOV     R0,#WRDREG
042A B00A              MOV     @R0,#LOW READY
042C D495              CALL    WORDSEND
042E           INITL:                          ; LOOP TURNS OFF SPO
042E 09                IN      A,P1
042F 3233              JB1     SBYOK
0431 842E              JMP     INITL
0433           SBYOK:
0433 8910              ORL     P1,#NOT SPOON
0435 8437              JMP     MONITOR
               ;
               ;―――――――――――――――――――――――――――――――――――――――――――――
               ;
               ;                       ; MONITOR LOOP
0437           MONITOR:
```

```
0437 D5                SEL     RB1
0438 B418              CALL    KBSCAN
043A C5                SEL     RB0
043B 147F              CALL    KBCMD
043D 8437              JMP     MONITOR
                ;
                ;----------------------------------------------------------------
                ;       SEND ONE ALLOPHONE TO SPO256
                ;----------------------------------------------------------------
                ;
043F            SPOSEND:
043F AA                MOV     AEX,A
0440            ALLNOK:
0440 09                IN      A,P1
0441 37                CPL     A
0442 1246              JB0     ALLOK
0444 8440              JMP     ALLNOK
0446            ALLOK:
0446 B858              MOV     R0,#ALLBUF
0448 F0                MOV     A,@R0
0449 53C0              ANL     A,#ALLMSK
044B 4A                ORL     A,AEX
044C A0                MOV     @R0,A
044D 90                MOVX    @R0,A
044E 99FB              ANL     P1,#ALD
0450 8904              ORL     P1,#NOT ALD
                ;
0452            ALLNOK1:
0452 09                IN      A,P1
0453 1252              JB0     ALLNOK1
0455            ALLOK1:
0455 83                RET
                ;----------------------------------------------------------------
                ;
                ;
                ;                       ; TAKES REGISTER PAIR @R0 AND SHIFTS RIGHT 1
                ;                       ; IF BIT 0 = 1 RETURNS WITH CARRY SET
0456            DBLSHF:
0456 97                CLR     C
0457 18                INC     R0
0458 F0                MOV     A,@R0
0459 67                RRC     A
045A A0                MOV     @R0,A
045B C8                DEC     R0
045C F0                MOV     A,@R0
045D 67                RRC     A
045E A0                MOV     @R0,A
045F 83                RET

;
                ;----------------------------------------------------------------
                ;
                ;
                ;                       ; BINBUF  TO PACKED BCD TO BCDBUF
                ;
                ;       PUTS SPEED IN BCDBUF.  TENS DIGIT IN THE HIGH NIBBLE,
                ;       UNITS DIGIT IN THE LOW NIBBLE.
                ;
0460            BINBCD:
0460 BA00              MOV     AEX,#0
```

```
0462            DIGCN1:
0462 B821               MOV     R0,#MSCREG
0464 B0F6               MOV     @R0,#-10
                ;
                ;                       CHECK FOR SPEEDS OVER 99
                ;
0466 B830               MOV     R0,#BINBUF
0468 239D               MOV     A,#-99
046A 97                 CLR     C
046B 60                 ADD     A,@R0
046C E670               JNC     DIGCN4
046E B063               MOV     @R0,#99
0470
0470            DIGCN4:
0470 B830               MOV     R0,#BINBUF
0472 B921               MOV     R1,#MSCREG
0474 97                 CLR     C
0475 F0                 MOV     A,@R0
0476 61                 ADD     A,@R1
0477 A0                 MOV     @R0,A
                ;
                ;                               ; SUM INTO TERM2
0478 E67D               JNC     GET1
047A 1A                 INC     AEX
```

57004 SKI SPEEDOMETER
MAIN MODULE; SKI SPEED 6/12/87

```
047B 8470               JMP     DIGCN4
                ;
047D            GET1:
047D 030A               ADD     A,#10
047F 47                 SWAP    A
0480 4A                 ORL     A,AEX
0481 47                 SWAP    A
0482 B825               MOV     R0,#BCDBUF
0484 A0                 MOV     @R0,A
0485 83                 RET
                ;
                ;_____
                ;
                ;                       ; PACKED BCD TO 4 BYTE ASCII
                ;
                ;
0486            CLR1NUM:
0486 F0                 MOV     A,@R0
0487 53F0               ANL     A,#HIMASK
0489 47                 SWAP    A
048A 0330               ADD     A,#30H
048C A1                 MOV     @R1,A
048D 19                 INC     R1
048E F0                 MOV     A,@R0
048F 530F               ANL     A,#LOMASK
0491 0330               ADD     A,#30H
0493 A1                 MOV     @R1,A
0494 83                 RET
```

```
                              ; _____
      ;
      ;
      ;                       ; TAKES REGISTER PAIR @R0 AND SHIFTS LEFT 1
      ;                       ; RESTORES R0
      ;
      ;
                              ; _____
      ;
0495          DBLINC:
0495 97         CLR     C               ; INCREMENT DOUBLE BYTE AT R0
0496 F0         MOV     A,@R0
0497 0301       ADD     A,#1
0499 A0         MOV     @R0,A
049A 18         INC     R0
049B F0         MOV     A,@R0
049C 1300       ADDC    A,#0
049E A0         MOV     @R0,A
049F C8         DEC     R0
04A0 83         RET
      ;
      ;
      ;                       _____
      ;
      ;                       ; BINHEX CONVERTS BYTE POINTED TO BY R0 INTO TWO HEX
      ;                       ; ASCII CHARACTERS IN HEXBUF LS CHAR FIRST

?7004 SKI SPEEDOMETER
MAIN MODULE; SKI SPEED 6/12/87

;
      ;                       ; EXIT: R0, R1, AND CONTENTS OF R0 ARE UNAFFECTED
      ;
04A1          BINHEX:
04A1 B931       MOV     R1,#HEXBUF
04A3 F0         MOV     A,@R0
04A4 530F       ANL     A,#LOMASK
04A6 03B5       ADD     A,#LOW HEXTAB
04A8 A3         MOVP    A,@A
04A9 A1         MOV     @R1,A
04AA 19         INC     R1
04AB F0         MOV     A,@R0
04AC 47         SWAP    A
04AD 530F       ANL     A,#LOMASK
04AF 03B5       ADD     A,#LOW HEXTAB
04B1 A3         MOVP    A,@A
04B2 A1         MOV     @R1,A
04B3 C9         DEC     R1
04B4 83         RET
      ;
04B5 30313233 HEXTAB:  DB      '0123456789ABCDEF'
      ;
      ;                       _____
      ;
;**********************************************************************
      ;
      ;
      ;                       ; DECREMENT DOUBLE BYTE @R0
04C5          DBLDEC:
04C5 B922       MOV     R1,#MSCREG+1
04C7 B1FF       MOV     @R1,#0FFH
04C9 C9         DEC     R1
04CA B1FF       MOV     @R1,#-1
04CC B40F       CALL    DBLADD1
```

```
04CE B400            CALL    LDBAK
04D0 83              RET
                ;
                ;————————————————————————————
                ;
                ;       DELAY 9.8 MSEC X 'COUNT'
                ;           ENTER WITH 'COUNT SET TO NUMBER OF LOOPS:
                ;
04D1 BE7F     DELAY: MOV     LOOP,#7FH
04D3 EED3     DEL1:  DJNZ    LOOP,DEL1
04D5 EDD1            DJNZ    COUNT,DELAY
04D7 83              RET
                ;————————————————————————————
                ;       MOVE    @R0 TO @R1 ; 2 BYTES
                ;
04D8 F0       DBLMOV: MOV    A,@R0
04D9 A1              MOV     @R1,A
04DA 18              INC     R0
```
;7004 SKI SPEEDOMETER
MAIN MODULE; SKI SPEED 6/12/87

```
04DB 19              INC     R1
04DC F0              MOV     A,@R0
04DD A1              MOV     @R1,A
04DE C8              DEC     R0
04DF C9              DEC     R1
04E0 83              RET
                ;————————————————————————————
                ;       NEGATES (CPL+1) DBL BYTE @R0
                ;
04E1 F0       DBLNEG: MOV    A,@R0
04E2 97              CLR     C
04E3 37              CPL     A
04E4 0301            ADD     A,#1
04E6 A0              MOV     @R0,A
04E7 18              INC     R0
04E8 F0              MOV     A,@R0
04E9 37              CPL     A
04EA 1300            ADDC    A,#0
04EC A0              MOV     @R0,A
04ED C8              DEC     R0
04EE 83              RET
                ;————————————————————————————
0500                         ORG     500H
                ;————————————————————————————
0500 FA       LDBAK:  MOV    A,AEX           ; STORE DBLADD/DBLSUB ANSWER AT R0
0501 A0              MOV     @R0,A
0502 18              INC     R0
0503 FF              MOV     A,SAVE
0504 A0              MOV     @R0,A
0505 C8              DEC     R0
0506 83              RET
                ;
0507 FA       LDBAK1: MOV    A,AEX           ; STORE DBLADD/DBLSUB ANSWER AT R1
0508 A1              MOV     @R1,A
0509 19              INC     R1
050A FF              MOV     A,SAVE
050B A1              MOV     @R1,A
050C C9              DEC     R1
050D 83              RET
```

```
;-----------------------------------------
;           TWO BYTE ADD
;
;       ENTRY R0 POINTS LS BYTE OF TERM1,R1 LS BYTE TERM2
;
;       EXIT AEX = LS BYTE OF SUM,SAVE = MS BYTE, CARRY SET IF OVERFLOW
;
050E 97     DBLADD: CLR     C
050F        DBLADD1:
050F F0             MOV     A,@R0
0510 61             ADD     A,@R1
0511 AA             MOV     AEX,A
```
87004 SKI SPEEDOMETER
MAIN MODULE; SKI SPEED 6/12/87

```
0512 18             INC     R0
0513 19             INC     R1
0514 F0             MOV     A,@R0
0515 71             ADDC    A,@R1
0516 AF             MOV     SAVE,A
0517 83     DBLRET: RET
            ;

;-----------------------------------------
000F        COLSET  EQU     00001111B       ; ZEROES COL LINES
00C0        KBDROW  EQU     11000000B
0003        CTRMASK EQU     00000011B       ; SNAPS OUT COUNTER BITS
            ;
            ;-----------------------------------------
0518        KBSCAN:
            ;
            ;       CHECK FOR FLAG = KEYBOARD SUCCESSFULLY READ
            ;
0518 761C   KBUPCK: JF1     CHKFLG
051A A467           JMP     ISKEYUP
051C B820   CHKFLG: MOV     R0,#CTLFLG
051E F0             MOV     A,@R0
051F F266           JB7     KBRET
0521        KYUP:
            ;
            ;       WRITE ZEROES TO COLUMNS
            ;
0521        KEYPRS?:
            ;
            ;       READ ROWS FOR ONE (OR MORE) ZEROES
            ;
0521 09             IN      A,P1
0522 53C0           ANL     A,#KBDROW
0524 D3C0           XRL     A,#KBDROW
            ;
            ;       KBROW = 11000000B ?
            ;
0526 C666           JZ      KBRET   ; NO KEY PRESSED
            ;
            ;       IF KEY PRESSED
            ;
0528 09             IN      A,P1
0529 53C0           ANL     A,#KBDROW
052B AE             MOV     LOOP,A
```

37004 SKI SPEEDOMETER
MAIN MODULE; SKI SPEED 6/12/87

```
                   ;       OTHERWISE:
0533 09     PASS:  IN      A,P1
0534 53C0          ANL     A,#KBDROW
0536 B954          MOV     R1,#ROW
0538 D1            XRL     A,@R1    ; COMPARE TO LAST PASS
0539 9660          JNZ     PASSNG   ; OOPS, BAD READ
053B B953          MOV     R1,#KBCTR
053D 11            INC     @R1               ; GOOD PASS, THEREFORE BUMP COUNTER
                   ;
                   ;       IS IT A READ ?
                   ;
053E F1     READCK: MOV    A,@R1    ; GET COUNTER
053F 5303          ANL     A,#CTRMASK
                   ;
0541 D302          XRL     A,#2     ; THREE PASSES?
0543 9666          JNZ     KBRET
                   ;
                   ;       YES:
                   ;
0545        KBGET:
                   ;
                   ;
0545 B820          MOV     R0,#CTLFLG
0547 F0            MOV     A,@R0
0548 4380          ORL     A,#KBCMFL
054A A0            MOV     @R0,A
                   ;
054B A5            CLR     F1
054C 09            IN      A,P1
054D 53C0          ANL     A,#KBDROW
054F 47            SWAP    A
0550 77            RR      A
0551 77            RR      A
0552 97            CLR     C
0553 B855          MOV     R0,#KBENTR
0555 67            RRC     A
0556 F65C          JC      NEXKEY
0558 B000          MOV     @R0,#0   ; 0 = 'START', 1 = 'END'
055A A466          JMP     KBRET
055C        NEXKEY:
055C B001          MOV     @R0,#1
055E A466          JMP     KBRET
                   ;
0560        PASSNG:
                   ;       CTRRES  RESETS COUNTER TO ZERO
                   ;
0560 B953          MOV     R1,#KBCTR
0562 F1            MOV     A,@R1
0563 53FC          ANL     A,#NOT CTRMASK
0565 A1            MOV     @R1,A
                   ;
```

37004 SKI SPEEDOMETER
MAIN MODULE; SKI SPEED 6/12/87

```
                   ;       EXIT POINT FROM KBSCAN
                   ;
```

```
0566 83        KBRET:  RET                     ; COMMON KBSCAN EXIT
               ;
               ;
               ;       KEYUP LOOKS FOR THREE PASSES OF 'NO KEY PRESSED'
               ;
               ;
               ;       ENTRY: NONE
               ;
               ;       EXIT: FLAG IS RESET AFTER THREE CONSECUTIVE PASSES OF 'NO KEY'
               ;
               ;
0567           ISKEYUP:
0567 09                IN      A,P1
0568 53C0              ANL     A,#KBDROW
056A D3C0              XRL     A,#KBDROW
056C C676              JZ      KEYUP
               ;
056E           KYUPEND:
               ;       CTRRES  RESETS COUNTER TO ZERO
               ;
056E B953              MOV     R1,#KBCTR
0570 F1                MOV     A,@R1
0571 53FC              ANL     A,#NOT CTRMASK
0573 A1                MOV     @R1,A
0574 A466              JMP     KBRET
0576 B953     KEYUP:   MOV     R1,#KBCTR
0578 F1                MOV     A,@R1
0579 5303              ANL     A,#CTRMASK
057B D302              XRL     A,#2    ; THREE KEYUP PASSES?
057D C682              JZ      KYUPAC  ; YES RESET FLAG
057F 11                INC     @R1             ; NO, BUMP COUNTER
0580 A466              JMP     KBRET
0582          KYUPAC:
               ;       FLGRES SETS FLAG BIT 0
               ;
0582 B953              MOV     R1,#KBCTR
0584 F1                MOV     A,@R1
0585 53FC              ANL     A,#NOT CTRMASK
0587 A1                MOV     @R1,A
               ;
0588 A5                CLR     F1
0589 B5                CPL     F1
               ;
058A A466              JMP     KBRET
               ;
               ;       FOR FIRST PASS, DON'T COMPARE TO 'ROW'
               ;
058C FE        FIRPAS: MOV     A,LOOP  ; GET ROW READ
058D B854              MOV     R0,#ROW

37004 SKI SPEEDOMETER
MAIN MODULE; SKI SPEED 6/12/87

058F A0                MOV     @R0,A   ; SAVE IT IN 'ROW'
0590 11                INC     @R1     ; BUMP PASS COUNTER
0591 A466              JMP     KBRET
               ;
               ;----------------------------------------
               ;
               ;       SUBROUTINES; KBSCAN
               ;
               ;----------------------------------------
```

;
; CLEAR 'EXECUTE COMMAND' FLAG
;

```
0593 B820    CLRKBF:   MOV    R0,#CTLFLG
0595 F0                MOV    A,@R0
0596 537F              ANL    A,#NOT KBCMFL
0598 A0                MOV    @R0,A
0599 83                RET
```
;---------------------------------------------------------
;

```
059A         START:                        ; RESETS TO ZERO SPDSUM,SUMCNT,SPDAVG,ETC.
059A B805              MOV    R0,#COUNT
059C B017              MOV    @R0,#23
059E B837              MOV    R0,#SPD
05A0         START1:
05A0 B000              MOV    @R0,#0
05A2 18                INC    R0
05A3 EDA0              DJNZ   COUNT,START1
```
;

```
05A5         START2:                       ; LOOP CHECKS IF 5 SECOND FLAG SET
05A5 B855              MOV    R0,#KBENTR
05A7 F0                MOV    A,@R0
05A8 D301              XRL    A,#1
05AA C6CD              JZ     STRTEND
```
;

```
05AC B820              MOV    R0,#CTLFLG
05AE F0                MOV    A,@R0
05AF 37                CPL    A
05B0 52A5              JB2    START2
05B2 37                CPL    A
05B3 53FB              ANL    A,#NOT SPKFLG
05B5 A0                MOV    @R0,A
```
;

```
05B6 99EF              ANL    P1,#SPOON        ; TURNS ON SPO
05B8 9AEF              ANL    P2,#SPOON        ; RESETS SPO
05BA B805              MOV    R0,#COUNT
05BC B001              MOV    @R0,#1
05BE 94D1              CALL   DELAY
05C0 8A10              ORL    P2,#NOT SPOON
```
;

```
05C2 3400              CALL   AVGSPD
```
;

87004 SKI SPEEDOMETER
MAIN MODULE; SKI SPEED 6/12/87

```
05C4         STARTL:                       ; LOOP TURNS OFF SPO
05C4 09                IN     A,P1
05C5 32C9              JB1    SBYOKS
05C7 A4C4              JMP    STARTL
05C9         SBYOKS:
05C9 8910              ORL    P1,#NOT SPOON
05CB A4A5              JMP    START2
```
;
; ROUTINE DIVIDES SPDSUM BY SUMCNT. RESULTS ARE
; STORED IN SPDAVG AND SPD.
;

```
05CD         STRTEND:
05CD B83B              MOV    R0,#SUMCNT
```

```
05CF 94E1              CALL    DBLNEG
05D1 B939              MOV     R1,#SPDSUM
05D3          STENDL:
05D3 B40E              CALL    DBLADD
05D5 C8                DEC     R0
05D6 C9                DEC     R1
05D7 B93D              MOV     R1,#SPDAVG
05D9 11                INC     @R1
05DA B939              MOV     R1,#SPDSUM
05DC B407              CALL    LDBAK1
05DE F6D3              JC      STENDL
05E0 B83D              MOV     R0,#SPDAVG
05E2 F0                MOV     A,@R0
05E3 03FF              ADD     A,#-1
05E5 A0                MOV     @R0,A
              ;                          THIS SECTION ROUNDS UP SPDAVG
05E6 B83B              MOV     R0,#SUMCNT
05E8 94E1              CALL    DBLNEG
05EA 9456              CALL    DBLSHF
05EC B40E              CALL    DBLADD
05EE E6F3              JNC     SCOND1
05F0 B83D              MOV     R0,#SPDAVG
05F2 10                INC     @R0
05F3          SCOND1:
05F3 541D              CALL    SCOND
05F5 542D              CALL    DISCAL
              ;
05F7 83                RET
              ;——————————————————————————————
0600                   ORG     600H
              ;——————————————————————————————
0600          END:
0600 B857              MOV     R0,#WRDREG    ;AVERAGE SPEED ANNOUNCE
0602 B014              MOV     @R0,#LOW AVG
0604 D495              CALL    WORDSEND
0606 B857              MOV     R0,#WRDREG
0608 B020              MOV     @R0,#LOW SPEED
060A D495              CALL    WORDSEND
060C B83D              MOV     R0,#SPDAVG
060E F0                MOV     A,@R0
060F B837              MOV     R0,#SPD
0611 A0                MOV     @R0,A
0612 342D              CALL    SPDH1
              ;
0614 94D1              CALL DELAY
              ;
0616 B857              MOV     R0,#WRDREG    ; MAX SPEED ANNOUNCE
0618 B04C              MOV     @R0,#LOW MAX
061A D495              CALL    WORDSEND
061C B857              MOV     R0,#WRDREG
061E B020              MOV     @R0,#LOW SPEED
0620 D495              CALL    WORDSEND
0622 B83E              MOV     R0,#MAXSPD
0624 F0                MOV     A,@R0
0625 B837              MOV     R0,#SPD
0627 A0                MOV     @R0,A
0628 342D              CALL    SPDH1
              ;
062A 94D1              CALL    DELAY
              ;
```

```
062C B857            MOV    R0,#WRDREG       ; TIME OF RUN ANNOUNCE
062E B059            MOV    @R0,#LOW TIME
0630 D495            CALL   WORDSEND
0632 B83F            MOV    R0,#RTCLMN
0634 F0              MOV    A,@R0
0635 C653            JZ     SECOND1
0637 B837            MOV    R0,#SPD
0639 A0              MOV    @R0,A
063A 342D            CALL   SPDH1
            ;
063C        MINUT:
063C B83F            MOV    R0,#RTCLMN
063E F0              MOV    A,@R0
063F 03FF            ADD    A,#-1
0641 964B            JNZ    MINUTS
0643 B857            MOV    R0,#WRDREG
0645 B06A            MOV    @R0,#LOW MINUTE
0647 D495            CALL   WORDSEND
0649 C45F            JMP    SECOND
064B        MINUTS:
064B B857            MOV    R0,#WRDREG
064D B072            MOV    @R0,#LOW MINUTES
064F D495            CALL   WORDSEND
0651 C45F            JMP    SECOND
0653        SECOND1:
0653 B841            MOV    R0,#RTCLSC
0655 F0              MOV    A,@R0
0656 965F            JNZ    SECOND
0658 B837            MOV    R0,#SPD
065A A0              MOV    @R0,A
065B 342D            CALL   SPDH1
065D C480            JMP    SPKDIS
065F        SECOND:
065F B841            MOV    R0,#RTCLSC
0661 F0              MOV    A,@R0
0662 C680            JZ     SPKDIS
0664 B837            MOV    R0,#SPD
0666 A0              MOV    @R0,A
0667 342D            CALL   SPDH1
0669        SEC:
0669 B841            MOV    R0,#RTCLSC
066B F0              MOV    A,@R0
066C 03FF            ADD    A,#-1
066E 9678            JNZ    SECS
0670 B857            MOV    R0,#WRDREG
0672 B07B            MOV    @R0,#LOW SECND
0674 D495            CALL   WORDSEND
0676 C480            JMP    SPKDIS
0678        SECS:
0678 B857            MOV    R0,#WRDREG
067A B084            MOV    @R0,#LOW SECNDS
067C D495            CALL   WORDSEND
            ;
067E 94D1            CALL   DELAY
            ;
0680        SPKDIS:
0680 5400            CALL   DISSPK
            ;
0682        BATTCHK:
0682 0A              IN     A,P2             ; CHECK BATTERIES
```

```
0683 B28D               JB5     ENDL
               ;
0685 94D1               CALL    DELAY
               ;
0687 B857               MOV     R0,#WRDREG
0689 B03B               MOV     @R0,#LOW BATT
068B D495               CALL    WORDSEND
               ;
068D        ENDL:                       ; LOOP TURNS OFF SPO
068D 09                 IN      A,P1
068E 3292               JB1     SBYOKE
0690 C48D               JMP     ENDL
0692        SBYOKE:
0692 8910               ORL     P1,#NOT SPOON
               ;
0694 83                 RET
               ;
               ;-----------------------------------------------------
               ;       SEND WORD TO SPO256
               ;
0695        WORDSEND:
0695        WORDNOK:
0695 09                 IN      A,P1
0696 329A               JB1     WORDOK
0698 C495               JMP     WORDNOK
069A        WORDOK:
069A B857               MOV     R0,#WRDREG
069C F0                 MOV     A,@R0
069D AB                 MOV     TMP1,A
069E E3     GETALL:     MOVP3   A,@A
069F 53F0               ANL     A,#0F0H
06A1 D3F0               XRL     A,#0F0H
06A3 96A7               JNZ     WORDNEND
06A5 C4AF               JMP     WORDMEND
06A7        WORDNEND:
06A7 FB                 MOV     A,TMP1
06A8 E3                 MOVP3   A,@A
06A9 943F               CALL    SPOSEND
06AB        WRDCNT:
06AB 1B                 INC     TMP1
06AC FB                 MOV     A,TMP1
06AD C49E               JMP     GETALL
06AF        WORDMEND:
06AF FB                 MOV     A,TMP1
06B0 E3                 MOVP3   A,@A
06B1 D3FF               XRL     A,#EOT
06B3 C6BB               JZ      WORDEND
06B5 FB                 MOV     A,TMP1
06B6 E3                 MOVP3   A,@A
06B7 345D               CALL    ALLDELY
06B9 C4AB               JMP     WRDCNT
06BB        WORDEND:
06BB 83                 RET
               ;-----------------------------------------------------
               ;       SEND NUMBER TO SPO
               ;
06BC        NUMSEND:
06BC        NUMNOK:
06BC 09                 IN      A,P1
06BD 32C1               JB1     NUMOK
```

```
06BF C4BC              JMP     NUMNOK
06C1           NUMOK:
06C1 B856              MOV     R0,#NUMREG
06C3 F0                MOV     A,@R0
06C4 AB                MOV     TMP1,A
06C5           FETCH:
06C5 F4E0              CALL    MOVP7
06C7 53F0              ANL     A,#0F0H
06C9 D3F0              XRL     A,#0F0H
06CB 96CF              JNZ     NUMNEND
06CD C4D8              JMP     NUMMEND
06CF           NUMNEND:
06CF FB                MOV     A,TMP1
06D0 F4E0              CALL    MOVP7
06D2 943F              CALL    SPOSEND
06D4           NUMCNT:
06D4 1B                INC     TMP1
06D5 FB                MOV     A,TMP1
06D6 C4C5              JMP     FETCH

06D8           NUMMEND:
06D8 FB                MOV     A,TMP1
06D9 F4E0              CALL    MOVP7
06DB D3FF              XRL     A,#EOT
06DD C6E6              JZ      NUMEND
06DF FB                MOV     A,TMP1
06E0 F4E0              CALL    MOVP7
06E2 345D              CALL    ALLDELY
06E4 C4D4              JMP     NUMCNT
06E6           NUMEND:
06E6 83                RET
               ;
               ;————————————————————————————
               ;
0700                   ORG     0700H
               ;————————————————————————————
               ;
0700           NUMTAB:
               ;
               ;       NUMBER LOOKUP TABLE FOR SPO-256
               ;
0700 2B3C3502  ZERO:   DB      ZZ,YR,OW,PA3,EOT
0705 2EFE0FF7  ONE:    DB      WW,S14,AX,S7,NN1,S7,PA5,EOT
070D 0D1F02FF  TWO:    DB      TT2,UW2,PA3,EOT
0711 1D1D27F7  THREE:  DB      TH,TH,RR2,S7,IY,PA3,EOT
0718 28283A02  FOUR:   DB      FF,FF,ORR,PA3,EOT
071D 28280623  FIVE:   DB      FF,FF,AY,VV,PA3,EOT
0723 37370C0C  SIX:    DB      SS,SS,IH,IH,PA3,KK2,SS,PA3,EOT
072C 37370723  SEVEN:  DB      SS,SS,EH,VV,IH,NN1,PA3,EOT
0734 13020D02  EIGHT:  DB      IY,PA3,TT2,PA3,EOT
0739 0B060B00  NINE:   DB      NN1,AY,NN1,PA1,EOT
073E 0D07070B  TEN:    DB      TT2,EH,EH,NN1,PA3,EOT
0744 0C2D0723  ELEVEN: DB      IH,LL,EH,VV,S5,IH,NN1,PA3,EOT
074D 0D30F73E  TWELVE: DB      TT2,WH,S7,EL,S14,VV,S5,PA3,EOT
0756 1DFA3301  THIRT:  DB      TH,S10,ER1,PA2,PA3,TT2,IY,NN1,PA3,EOT
0760 283A0102  FOURT:  DB      FF,ORR,PA2,PA3,TT2,IY,NN1,PA3,EOT
0769 280C2801  FIFT:   DB      FF,IH,FF,PA2,PA3,TT2,IY,NN1,PA3,EOT
0773 370C0229  SIXT:   DB      SS,IH,PA3,KK2,SS,PA2,PA3,TT2,IY,PA2,NN1,PA5,EOT
0780 37072307  SEVT:   DB      SS,EH,VV,EH,NN1,PA2,PA3,TT2,IY,NN1,PA3,EOT
078C 1401020D  EIGHTN: DB      EY,PA2,PA3,TT2,IY,NN1,PA3,EOT
0794 0B060B01  NINT:   DB      NN1,AY,NN1,PA2,PA3,TT2,IY,NN1,PA3,EOT
079E 0D300707  TWENTY: DB      TT2,WH,EH,EH,NN1,PA3,TT2,IY,PA1,EOT
```

```
07A8  1D340211   THIRTY:  DB     TH,ER2,PA3,TT1,IY,PA1,EOT
07AF  283A0211   FORTY:   DB     FF,ORR,PA3,TT1,IY,PA1,EOT
07B6  280C2802   FIFTY:   DB     FF,IH,FF,PA3,TT1,IY,PA1,EOT
07BE  370C0229   SIXTY:   DB     SS,IH,PA3,KK2,SS,PA3,TT1,IY,PA1,EOT
07C8  3707230C   SEVENTY: DB     SS,EH,VV,IH,NN1,PA3,TT1,IY,PA1,EOT
07D2  14021113   EIGHTY:  DB     EY,PA3,TT1,IY,PA3,EOT
07D8  0B060B00   NINETY:  DB     NN1,AY,NN1,PA1,TT1,IY,PA1,EOT
                          ;
07E0             MOVP7:
07E0  A3                  MOVP   A,@A
07E1  83                  RET

;
                 ;
                 ;————————————————————————————————————————

0000                      END ;SOURCE CODE
```

APPENDIX B
SYMBOL TABLE

| | | | | | | | | | |
|---|---|---|---|---|---|---|---|---|---|
| AA | 0018 | DBLSHF2 | 0109 | GLITCH | 0017 | MILSUM | 004C | POINT | 0334 |
| ADDSEC | 0224 | DD1 | 0015 | HALT | 0001 | MINUT | 063C | PP | 0009 |
| AE | 001A | DD2 | 0021 | HEXBUF | 0031 | MINUTE | 036A | RAMSTRT | 0020 |
| AEX | R2 | DEL1 | 04D3 | HEXTAB | 04B5 | MINUTES | 0372 | RAMTOP | 005A |
| ALD | FFFB | DELAY | 04D1 | HH1 | 001B | MINUTS | 064B | RCK1 | 0079 |
| ALLBUF | 0058 | DH1 | 0012 | HH2 | 0039 | MM | 0010 | RCLK | 001B |
| ALLCTR | 0059 | DH2 | 0036 | HIMASK | 00F0 | MONITOR | 0437 | READCK | 053E |
| ALLDELY | 015D | DIGCN1 | 0462 | HUNMSEC | 002F | MOVP7 | 07E0 | READY | 030A |
| ALLMSK | 00C0 | DIGCN4 | 0470 | IH | 000C | MSCREG | 0021 | RESET | 0000 |
| ALLNOK | 0440 | DISCAL | 022D | INIT | 0400 | MSEC10 | 0044 | RESTRT | 0050 |
| ALLNOK1 | 0452 | DISSPK | 0200 | INIT1 | 0405 | MSEC100 | 0045 | ROW | 0054 |
| ALLOK | 0446 | DISTNC | 0046 | INITL | 042E | MSGREG | 002A | RR1 | 000E |
| ALLOK1 | 0455 | DOKBCM | 0085 | INTAK | 0008 | MSGTAB | 0300 | RR2 | 0027 |
| AO | 0017 | EH | 0007 | INTR | 0003 | MSGTOP | 038D | RTCL5SC | 0040 |
| AR | 003B | EIGHT | 0734 | INTSVC | 000E | NEXKEY | 055C | RTCLIT | 0043 |
| AVG | 0314 | EIGHTJ | 019D | ISKEYUP | 0567 | NG | 002C | RTCLMN | 003F |
| AVGSPD | 0100 | EIGHTN | 078C | IY | 0013 | NINE | 0739 | RTCLSC | 0041 |
| AVGSPD1 | 0158 | EIGHTNJ | 01A7 | JH | 000A | NINEJ | 019E | RTINIT | 0409 |
| AW | 0020 | EIGHTY | 07D2 | JREALT | 000D | NINETY | 07D8 | RTMIN | 006D |
| AX | 000F | EIGHTYJ | 01AF | JREG | R3 | NINETYJ | 01B0 | RTRET | 001F |
| AY | 0006 | EJMP | 00AD | KBCMD | 007F | NINT | 0794 | RTROLL | 007B |
| BANK | R7 | EL | 003E | KBCMFL | 0080 | NINTJ | 01A8 | RTSEC | 004E |
| BATT | 033B | ELEVEN | 0744 | KBCTR | 0053 | NN1 | 000B | RTSEC1 | 0062 |
| BATTCHK | 0682 | ELEVNJ | 01A0 | KBDROW | 00C0 | NN2 | 0038 | S1 | 00F1 |
| BATTOK | 0428 | END | 0600 | KBENTR | 0055 | NUMBUF1 | 0026 | S10 | 00FA |
| BB1 | 001C | ENDL | 068D | KBGET | 0545 | NUMBUF2 | 0027 | S11 | 00FB |
| BB2 | 003F | EOT | 00FF | KBRET | 0566 | NUMBUF3 | 0028 | S12 | 00FC |
| BCDBUF | 0025 | ER1 | 0033 | KBSCAN | 0518 | NUMBUF4 | 0029 | S13 | 00FD |
| BINBCD | 0460 | ER2 | 0034 | KBUPCK | 0518 | NUMCNT | 06D4 | S14 | 00FE |
| BINBUF | 0030 | EY | 0014 | KEYPRS | 0521 | NUMEND | 06E6 | S2 | 00F2 |
| BINHEX | 04A1 | FETCH | 06C5 | KEYTAB | 008B | NUMMEND | 06D8 | S3 | 00F3 |
| CH | 0032 | FF | 0028 | KEYUP | 0576 | NUMNEND | 06CF | S4 | 00F4 |
| CHKFLG | 051C | FIFT | 0769 | KK1 | 002A | NUMNOK | 06BC | S5 | 00F5 |
| CLR1NUM | 0486 | FIFTJ | 01A4 | KK2 | 0029 | NUMOK | 06C1 | S6 | 00F6 |
| CLRKBF | 0593 | FIFTY | 07B6 | KK3 | 0008 | NUMREG | 0056 | S7 | 00F7 |
| CODSTRT | 005A | FIFTYJ | 01AC | KYUP | 0521 | NUMSEND | 06BC | S8 | 00F8 |
| COLSET | 000F | FIRPAS | 058C | KYUPAC | 0582 | NUMTAB | 0700 | S9 | 00F9 |
| CONST | 004E | FIVE | 071D | KYUPEND | 056E | NUMTOP | 01B0 | SAVE | R7 |

| | | | | | | | |
|---|---|---|---|---|---|---|---|
| COUNT | R5 | FIVEJ | 019A | LDBAK | 0500 | OKSBY | 00A9 | SBYOK | 0433 |
| CR | 000D | FORTY | 07AF | LDBAK1 | 0507 | ONE | 0705 | SBYOKE | 0692 |
| CTLFLG | 0020 | FORTYJ | 01AB | LL | 002D | ONEJ | 0196 | SBYOKS | 05C9 |
| CTRMASK | 0003 | FOUR | 0718 | LOBAT | 0020 | ORR | 003A | SCOND | 021D |
| DATAPTR | 002F | FOURJ | 0199 | LOMASK | 000F | OW | 0035 | SCOND1 | 05F3 |
| DBLADD | 050E | FOURT | 0760 | LOOP | R6 | OY | 0005 | SEC | 0669 |
| DBLADD1 | 050F | FOURTJ | 01A3 | LOOP1 | 0160 | PA1 | 0000 | SECND | 037B |
| DBLDEC | 04C5 | GENEQU | 005A | LOOP2 | 0162 | PA2 | 0001 | SECNDS | 0384 |
| DBLINC | 0495 | GET1 | 047D | MAX | 034C | PA3 | 0002 | SECOND | 065F |
| DBLMOV | 04D8 | GETALL | 069E | MAXSPD | 003E | PA4 | 0003 | SECOND1 | 0653 |
| DBLNEG | 04E1 | GG1 | 0024 | MILE | 0048 | PA5 | 0004 | SECS | 0678 |
| DBLRET | 0517 | GG2 | 003D | MILEL | 0243 | PASS | 0533 | SETGO | 0300 |
| DBLSHF | 0456 | GG3 | 0022 | MILES | 032C | PASSNG | 0560 | SEVEN | 072C |
| SEVENJ | 019C | SPDTAB | 0195 | TENJ | 019F | TNTH3 | 02AB | WORDFL | 0002 |
| SEVENTY | 07C8 | SPEED | 0320 | TENMSEC | 003D | TNTHCY | 02B7 | WORDMEND | 06AF |
| SEVNTJ | 01AE | SPKDIS | 0680 | TENTH | 0049 | TREG | R4 | WORDNEND | 06A7 |
| SEVT | 0780 | SPKFLG | 0004 | TENTH1 | 004A | TT1 | 0011 | WORDNOK | 0695 |
| SEVTJ | 01A6 | SPKSPD | 017D | TENTH2 | 004B | TT2 | 000D | WORDOK | 069A |
| SH | 0025 | SPKSPD1 | 0187 | TH | 001D | TWELVE | 074D | WORDSEND | 0695 |
| SIX | 0723 | SPOEQU | 005A | THIRT | 0756 | TWELVEJ | 01A1 | WRDCNT | 06AB |
| SIXJ | 019B | SPOON | 00EF | THIRTJ | 01A2 | TWENTJ | 01A9 | WRDREG | 0057 |
| SIXT | 0773 | SPOSEND | 043F | THIRTY | 07A8 | TWENTY | 079E | WW | 002E |
| SIXTJ | 01A5 | SS | 0037 | THREE | 0711 | TWO | 070D | XR | 002F |
| SIXTY | 07BE | START | 059A | THREEJ | 0198 | TWOJ | 0197 | YR | 003C |
| SIXTYJ | 01AD | START1 | 05A0 | THRTYJ | 01AA | UH | 001E | YY1 | 0031 |
| SJMP | 008D | START2 | 05A5 | TIME | 0359 | UW1 | 0016 | YY2 | 0019 |
| SJMPL | 00A4 | STARTL | 05C4 | TIMER | 0007 | UW2 | 001F | ZERO | 0700 |
| SPD | 0037 | STENDL | 05D3 | TMP1 | R3 | VANECNT | 0035 | ZEROJ | 0195 |
| SPDAVG | 003D | STRTCHK | 00B9 | TMP2 | R4 | VANECTR | 0033 | ZH | 0026 |
| SPDH | 0110 | STRTEND | 05CD | TMPREG | 002B | VANMIL | 0051 | ZZ | 002B |
| SPDH0 | 0128 | SUMCNT | 003B | TNMSEC | 0025 | VCNTCPL | 0001 | | |
| SPDH1 | 012D | SUMSPD | 023B | TNTH1 | 025E | VV | 0023 | | |
| SPDH2 | 0134 | SUMSPD2 | 027D | TNTH2 | 0267 | WH | 0030 | | |
| SPDSUM | 0039 | TEN | 073E | TNTH2L | 0285 | WORDEND | 06BB | | |

What is claimed is:

1. In combination with a movable structure adapted to ride on or over a surface while supporting or carrying at least one person, a velocity-measuring device comprising means responsive to air flow for developing an electrical signal representative of current velocity of the movable structure, voice synthesizing means responsive to the electrical signal representation of current velocity for providing periodic voice synthesized audible output indicative of current velocity of the movable structure, and means responsive to the electrical signal for storing representations of velocity-based data for later retrieval.

2. The combination according to claim 1, wherein said velocity-measuring device and the voice synthesizing means are removably fixed to the movable structure.

3. The combination according to claim 1, wherein said means responsive to the electrical signal provides periodic voice synthesized audible output indicative of current velocity of the movable structure at substantially five second intervals.

4. The combination according to claim 1, wherein said means responsive to the electrical signal includes a loudspeaker for providing the voice synthesized audible output.

5. The combination according to claim 1, wherein said means responsive to the electrical signal includes earphone means for providing the voice synthesized audible output.

6. The combination according to claim 1, wherein said structure comprises a snow- or ice-engaging structure.

7. The combination according to claim 1, wherein said structure comprises a snow ski.

8. The combination according to claim 1, wherein said structure comprises a skateboard.

9. The combination according to claim 1, wherein said structure comprises a water ski.

10. The combination according to claim 1, wherein said structure comprises a surfboard.

11. The combination according to claim 1, wherein said structure comprises a wind-surfer.

12. The combination according to claim 1, wherein said structure comprises a bicycle.

13. The combination according to claim 1, wherein said structure comprises an ice-boat.

14. In combination with a structure adapted to be removably fixed to a person, a velocity-measuring device fixed to the structure and comprising means responsive to air flow for developing an electrical signal representative of current velocity of the structure and thus the person, voice synthesizing means responsive to the electrical signal representation of current velocity for providing periodic voice synthesized audible outputs indicative of current velocity of the structure and thus the person, and means responsive to the electrical signal for storing representations of velocity-based data for later retrieval.

15. The combination according to claim 14, wherein said means responsive to the electrical signal provides periodic voice synthesized audible output indicative of current velocity of the structure and thus the person at substantially five second intervals.

16. The combination according to claim 14, wherein said means responsive to the electrical signal includes a loudspeaker for providing the voice synthesized audible output.

17. The combination according to claim 14, wherein said means responsive to the electrical signal includes earphone means for providing the voice synthesized audible output.

18. The combination according to claim 14, wherein said structure comprises a band which is adapted to be attached to a person and carry the device.

19. The combination according to claim 18, wherein said band is an arm band.

20. A combination comprising a movable structure adapted to ride on or over a surface while supporting or carrying at least one person, a velocity-measuring device for developing an electrical signal representative of current velocity of the movable structure, voice synthesizing means responsive to the electrical signal representation of current velocity for providing periodic voice synthesized audible output indicative of current velocity of the movable structure, and means responsive to the electrical signal for storing representations of velocity-based data for later retrieval.

21. A combination comprising a structure adapted to be removably fixed to a person, a velocity-measuring device fixed to the structure for developing an electrical signal representative of current velocity of the structure and thus the person, voice synthesizing means responsive to the electrical signal representation of current velocity for providing periodic voice synthesized audible outputs indicative of current velocity of the structure and thus the person, and means responsive to the electrical signal for storing representations of velocity-based data for later retrieval.

22. A circuit for measuring velocity comprising means for producing an electrical signal representative of velocity, microprocessor means, including programming means, responsive to the electrical signal for generating output signals representative of current velocity, speech synthesizer means coupled to said microprocessor means and responsive to the output signals for developing synthesized audio signals representing velocity, sound producing means coupled to said speech synthesizer and responsive to the synthesized audio signals for producing an audible output reporting velocity and/or velocity-related data, and means responsive to the electrical signal for storing representations of velocity-based data for later retrieval.

23. In combination, a support, a velocity-measuring device comprising means responsive to air flow for developing an electrical signal representative of current velocity of the support, voice synthesizing means responsive to the electrical signal representative of current velocity for providing voice synthesized audible outputs indicative of current velocity of the support, and a fabric mounting system for removably fixing the velocity-measuring device to the support.

24. The combination according to claim 23, wherein said fabric mounting system comprises a first elongated fabric member fixed to a surface of the support and a second fabric member fixed to a surface of the device.

25. The combination according to claim 23, wherein said velocity-measuring device and the voice synthesizing means are removably fixed to the movable structure.

26. The combination according to claim 23, wherein said means responsive to the electrical signal provides periodic voice synthesized audible output indicative of current velocity of the movable structure at substantially five second intervals.

27. The combination according to claim 23, wherein said means responsive to the electrical signal includes a loudspeaker for providing the voice synthesized audible output.

28. The combination according to claim 23, wherein said means responsive to the electrical signal includes earphone means for providing the voice synthesized audible output.

29. The combination according to claim 23, further including means responsive to the electrical signal for storing representations of velocity-based data of the movable structure for later retrieval.

30. The combination according to claim 23, including means responsive to the electrical signal for producing and storing representations of average speed, maximum speed, elapsed time and distance for later retrieval.

31. The combination according to claim 23, wherein said structure comprises a snow- or ice-engaging structure.

32. The combination according to claim 23, wherein said structure comprises a snow ski.

33. The combination according to claim 23, wherein said structure comprises a skateboard.

34. The combination according to claim 23, wherein said structure comprises a water ski.

35. The combination according to claim 23, wherein said structure comprises a surfboard.

36. The combination according to claim 23, wherein said structure comprises a wind-surfer.

37. The combination according to claim 23, wherein said structure comprises a bicycle.

38. The combination according to claim 23, wherein said structure comprises an ice-boat.

39. In combination with a movable structure adapted to ride on or over a surface while supporting or carrying at least one person, a velocity-measuring device comprising means responsive to air flow for developing an electrical signal representative of current velocity of the movable structure, voice synthesizing means responsive to the electrical signal representation of current velocity for providing periodic voice synthesized audible output indicative of current velocity of the movable structure, and means responsive to the electrical signal for producing and storing representations of average speed, maximum speed, elapsed time and distance for later retrieval.

40. The combination according to claim 39, wherein said velocity-measuring device and the voice synthesizing means are removably fixed to the movable structure.

41. The combination according to claim 39, wherein said means responsive to the electrical signal provides periodic voice synthesized audible output indicative of current velocity of the movable structure at substantially five second intervals.

42. The combination according to claim 39, wherein said means responsive to the electrical signal includes a loudspeaker for providing the voice synthesized audible output.

43. The combination according to claim 39, wherein said means responsive to the electrical signal includes earphone means for providing the voice synthesized audible output.

44. The combination according to claim 39, wherein said structure comprises a snow- or ice-engaging structure.

45. The combination according to claim 39, wherein said structure comprises a snow ski.

46. The combination according to claim 39, wherein said structure comprises a skateboard.

47. The combination according to claim 39, wherein said structure comprises a water ski.

48. The combination according to claim 39, wherein said structure comprises a surfboard.

49. The combination according to claim 39, wherein said structure comprises a wind-surfer.

50. The combination according to claim 39, wherein said structure comprises a bicycle.

51. The combination according to claim 39, wherein said structure comprises a ice-boat.

52. In combination with a structure adapted to be removably fixed to a person, a velocity-measuring device fixed to the structure and comprising means responsive to air flow for developing an electrical signal representative of current velocity of the structure and thus the person, voice synthesizing means responsive to the electrical signal representation of current velocity for providing periodic voice synthesized audible outputs indicative of current velocity of the structure and thus the person, and means responsive to the electrical signal for producing and storing representations of average speed, maximum speed, elapsed time and distance for later retrieval.

53. The combination according to claim 52, wherein said means responsive to the electrical signal provides periodic voice synthesized audible output indicative of current velocity of the structure and thus the person at substantially five second intervals.

54. The combination according to claim 52, wherein said means responsive to the electrical signal includes a loudspeaker for providing the voice synthesized audible output.

55. The combination according to claim 52, wherein said means responsive to the electrical signal includes earphone means for providing the voice synthesized audible output.

56. The combination according to claim 52, wherein said structure comprises a band which is adapted to be attached to a person and carry the device.

57. The combination according to claim 56, wherein said band is an arm band.

* * * * *